United States Patent [19]
Johnson et al.

[11] Patent Number: 5,258,933
[45] Date of Patent: Nov. 2, 1993

[54] TIMING CONTROL FOR PRML CLASS IV SAMPLING DATA DETECTION CHANNEL

[75] Inventors: Kenneth E. Johnson, San Jose; William L. Abbott, Portola Valley; Hung C. Nguyen, San Jose, all of Calif.

[73] Assignee: Quantum Corporation, Milpitas, Calif.

[21] Appl. No.: 936,756

[22] Filed: Aug. 27, 1992

[51] Int. Cl.$^5$ .......................... G06J 1/00; G06F 15/31
[52] U.S. Cl. ................................. 364/602; 364/724.01
[58] Field of Search .................. 364/602, 825, 724.01; 375/18

[56] References Cited

U.S. PATENT DOCUMENTS

| | | | |
|---|---|---|---|
| 4,504,872 | 3/1985 | Peterson | 360/40 |
| 4,644,564 | 2/1987 | Dolivo et al. | 375/18 |
| 4,847,871 | 7/1989 | Matsushita et al. | 375/94 |
| 4,890,299 | 12/1989 | Dolivo et al. | 375/18 |

OTHER PUBLICATIONS

Wood, Peterson, "Viterbi Detection of Class IV Partial Response on a Magnetic Recording Channel", *IEEE Trans. on Communications*, vol. Com-34 No. 5 May 1986, pp. 454-461.

Schmerbeck, Richetta, Smith, "A 27 MH$_2$ Mixed Analog/Digital Magnetic Recording Channel BSP Using Partial Response Signalling with Maximum Likelihood Detection" *Proc 1991 IEEE Solid State Circuits Conf.* pp. 136-137, 304, and pp. 97, 256 Slide Supplement.

Wood, Ahigrim, Houarmasek, Swenson, "An Experimental Eight-inch Disc Drive with 100 Bytes Per Surface" *IEEE Trans. on Magnetics* vol. Mag-20, No. 5, Sep. 1984 pp. 698-702.

Kubayashi, Tang, "Application of Partial-Response Channel Coding to Magnetic Recording Systems," *IBM Journal of Research and Develop.* Jul. 1970 pp. 368-375.

Kobayashi, "Application of Probabilistic Decoding to Digital Magnetic Recording Systems" *IBM Journal of Research and Develop.* Jan. 1971, pp. 64-74.

Dolivo, "Signal Processing of High-Density Digital Magnetic Recording" *Proc. 1989 IEEE VLSI and Computer Peripherals*, Hamburg, West Germany, May 1989 pp. 1-91 to 1-96.

Coker, Galbraith, Kerwin, Rae, Zipeadvich, "Implementation of PRML in a Rigid Disk Drive" *IEEE Trans. on Magnetics*, vol 27, No. 6 Nov. 1991.

Cideciyan, Dolivo, Hermann, Hirt, Schott, "A PRML System for Digital Magnetic Recording" *IEEE Journal on Selected Areas of Communication*, vol. 10, No. 1, Jan. 1992, pp. 38-56.

Dolivo, Schott, Ungerböck, "Fast Timing Recovery for Partial Response Signalling Systems" *Proc. ICC '89 (IEEE)*. Boston, Mass., Jun. 11-14, 1989 pp. 0573-0577.

K. H. Mueller, M. Müller, "Timing Recovery in Digital Synchronous Data Receivers", *IEEE Trans. on Comm.* vol. Com-24, No. 5, May, 1976 pp. 516-531.

S.U.H. Qureshi, "Timing Recovery for Equalized Partial-Response Systems" *IEEE Trans. on Comm.* Dec. 1976 pp. 1326-1331.

*Primary Examiner*—Tan V. Mai
*Attorney, Agent, or Firm*—David B. Harrison

[57] ABSTRACT

A multi-mode timing loop for a PR4,ML sampled data channel includes an analog to digital converter and a digital finite impulse response filter for providing conditioned digital samples. The timing loop includes a reference clock source for putting out a reference clock frequency related to a nominal sample data rate, a frequency controllable oscillator connected to generate a sample clock, an analog timing loop and a digital timing loop. The analog timing loop provides phase lock during non-data read mode, and during data read mode the digital timing loop provides a vernier offset for fine adjustment of phase lock to a static setting then provided by the analog timing loop.

15 Claims, 14 Drawing Sheets

TIMING CONTROL FOR PRML CLASS IV SAMPLING DATA DETECTION CHANNEL

REFERENCE TO RELATED APPLICATION

The present invention is related to U.S. patent application Ser. No. 07/937,064 filed on Aug. 27, 1992 and entitled DISK DRIVE USING PRML CLASS IV SAMPLING DATA DETECTION WITH DIGITAL ADAPTIVE EQUALIZATION, the disclosure of which is hereby incorporated herein by reference.

FIELD OF THE INVENTION

The present invention relates to data communications and storage methods and apparatus employing 8/9ths coding and synchronized, partial response, maximum likelihood ("PRML") detection. More particularly, the present invention relates to timing control methods and apparatus for a partial response, class IV, maximum likelihood (hereinafter referred to as "PR4,ML") data channel having digital adaptive equalization.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. in this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code is generally thought of as a rate eight-ninths code, meaning that nine code bits are required for eight incoming data bits. (Theoretically, the (0,4,4) code ratio is somewhat higher, approaching 0.961) Thus, this code is significantly more efficient than a rate two-thirds code, such as (1,7) RLL. Use of a (0,4,4) code results in a significantly greater net user data storage capacity on the disk surface, given a constant bit cell rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D=e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications*, vol. Com-34, No. 5, May 1986, pp. 434–461, authors Wood and Peterson explain the derivation of PR4 as being formed by subtracting waveforms two bit intervals apart, thereby forming an analog domain ternary "eye" pattern graphed herein in FIG. 2.

The Viterbi algorithm provides an iterative method of determing the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{Y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", *Proc.* 1991 *IEEE International Solid State Circuits Conference*, pp. 136–137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4; ML data channel from any need for handling of embedded servo information or for rapid resynchronization to the coded data stream following each embedded servo sector.

Prior Viterbi detector architectures and approaches applicable to processing of data sample sequences taken from a communications channel or from a recording device are also described in the Dolivo et al. U.S. Pat. No. 4,644,564. U.S. Pat. No. 4,504,872 to Peterson describes a digital maximum likelihood detector for class IV partial response signalling. An article by Roger W. Wood and David A. Peterson, entitled: "Viterbi Detection of Class IV Partial Response on a Magnetic Recording Channel" *IEEE Trans. on Comm.* Vol. Com-34, No. 5, May 1986, pp. 454–466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics*, Vol. Mag-20, No. 5, September 1984, pp 698–702 describes application of class IV partial response encoding and Viterbi detection techniques as applied within an experimental disk drive. A digital Viterbi detector capable of withstanding lower signal to noise ratios, is described in Matsushita et al. U.S. Pat. No. 4,847,871. These documents are representative examples of the known state of the prior art.

When zoned data recording techniques, embedded servo sectors, and e.g. thin-film heads are employed in a high performance, very high capacity, low servo overhead disk drive, the prior approaches are not adequate, and a hitherto unsolved need has arisen for an approach incorporating PR4, ML techniques into a high capacity, high performance, low cost disk drive architecture including architectural features such as e.g. thin-film heads, embedded sector servo based head positioning, and zone-data-recording techniques.

In particular, the prior art has not adequately addressed the stringent timing control requirements needed within such an architecture. In prior art approaches, phase locked loops have been employed to provide for timing control for proper sampling of analog data. In such prior art circuits, a loop filter within the PLL has provided operating point memory and has established the dynamics of the PLL. In the prior systems, there were two basic timing control modes of operation: READ and NON-READ. Locking the clock recovery PLL to a frequency reference during non-read initialized the operating point and continuously refreshed the operating point memory. Usually, the memory had been implemented as a charge-holding capacitor which, except for the fact of periodic updating, would otherwise lose its charge over time due to leakage, parasitic currents, etc.

The timing loop dynamics are important in a sampled data recovery system. Performance determines both the time required to recover from transient conditions as well as the quality of the recovered clock. The PLL must quickly acquire the data clock frequency and phase when beginning to read data, so that the amount e.g. of disk area that must be assigned for this acquisition time is minimized. Transient conditions occur when initializing a READ operation due to the phase and frequency of the data differing from the phase and frequency of the clock recovery circuit at the switch-over from NON-READ to READ mode. While the operating point memory reduces the size of the frequency and phase step between NON-READ and READ modes, the memory does not eliminate such step size, because of e.g. drifts in disk rotational speed and reference frequency. Often the loop filter has been a compromise between good transient response and good recovered clock quality. For good clock quality, the loop bandwidth should be narrow so that phase noise in the data is attenuated in the recovered clock control signal. For fastest transient response, the timing loop bandwidth should be made as wide as possible.

One prior approach for timing control has been employed in conventional peak detection of data, as noted above. In peak detection the peaks of the readback signal represent the encoded data "ones". The "zeros" are represented by a lack of a signal peak. Phase locked loop techniques have been used to lock onto the peaks of the readback signal and generate a data clock that is then used to synchronize the detected data peaks ("raw data") into fixed clock time intervals. This framing of the raw data is needed to eliminate e.g. spindle jitter and noise otherwise associated with disk drive magnetics, electronics, and mechanics.

In conventional disk drives employing peak detection techniques, during NON-READ mode, the timing PLL has been locked to a frequency reference that is very near the data clock frequency, so that upon transition to READ mode, the PLL takes less time to lock to the data because it is already close in frequency. A typical peak detection channel timing PLL has included a phase/frequency detector, a charge pump, and a voltage controlled oscillator (VCO). Logic gating at the input of the phase/frequency detector has been employed to lock to a frequency reference during NON-READ and then to lock to the read signal during READ. This simple switching approach has been possible because the reference clock signal and the raw data were both logic waveforms where the frequency and phase information are contained in the logic transition edges. The PLL operating frequency that is acquired from the frequency reference is "remembered" when switching to READ mode e.g. by storage across a capacitor at the output of the charge pump. The capacitor holds the charge associated with a given frequency. This approach, while working satisfactorily within peak detection data recovery channels, has not been compatible with timing recovery and control for sampled data systems, such as PR4,ML.

In a PR4,ML system, a PLL has been needed to generate a coherent clock, since the data samples must be taken at particular places on the readback waveform. Phase and frequency of the data is detected by digitally processing the data samples rather than by comparing signal transition edges as in peak detection techniques.

The digital circuitry processes the data samples to make phase/frequency error estimates and then sends these digital estimates to a timing control DAC. For the same reasons as discussed above in connection with peak detection, locking to a reference frequency during NON-READ mode is desirable. Separate phase/frequency detector circuits must be used for the data samples and the reference clock, since these signals are different in nature. During NON-READ mode the circuitry for sensing the reference clock is selected to control the PLL oscillator frequency, and during READ mode, the data sample sensing circuitry has to be used.

A prior approach followed by IBM has been described in several articles including Coker et al., "Implementation of PRML in a Rigid Disk Drive", *IEEE Trans, on Magnetics*, Vol. 27, No. 6, November 1991, pp 4538–4543; and, Cideciyan et al, "A PRML System for Digital Magnetic Recording", *IEEE Journal on Selected Areas in Communications*, Vol. 10, No. 1, January 1992, pp 38–56. In the described approach, a common analog loop compensation filter was used during both READ mode and NON-READ mode. While that approach had the advantage of automatically remembering the PLL operating point as had been the case with prior peak detection data channels, it did not enable separate loop compensation during the two different modes and did not facilitate the use of a digital loop filter during READ mode sample times.

Another technique known to the prior art in conjunction with peak detection techniques is generally referred to as "zero phase start". This technique enables a phase pause of controllable duration to be applied within a timing control loop. In the prior art peak detection timing loop described above, the VCO has had an ENABLE input that allows for controlled starting and stopping of the oscillator. Thus, when an ENABLE control is asserted, the oscillator will begin oscillating in a known state. Thus, the clock transition rising edges, which contain the important timing aspect of the resultant clock signal, occur at a fixed delay interval after assertion of the ENABLE control signal. The prior zero phase start logic sensed a transition of a read gate control signal RDGATE from inactive to active (indicating initiation of READ mode) and deasserted ENABLE, stopping the VCO. Upon arrival of a subsequent raw data transition edge in the analog data stream at the zero phase logic, the ENABLE control signal is reasserted and the timing loop VCO was restarted. A timing delay block matched the delays associated with detecting the raw data edge and restart of the VCO, so that the raw data edge and the first clock edge put out by the timing loop VCO coincided at the input to the phase/frequency detector simultaneously, or nearly simultaneously. Thus, the starting phase error was near zero, and PLL acquisition time was reduced.

A representative state of the prior art is found in an article by Dolivo et al, entitled "Fast Timing Recovery for Partial-Response Signalling Systems", *Proc. of ICC '89 (IEEE)*, Boston, Mass., Jun. 11–14, 1989, (five page paper); U.S. Pat. No. 4,122,501 to Sordello et al. and entitled "System for Recording and Reading Back Data on a Recording Media"; and, U.S. Pat. No. 5,065,116 to Ueda et al., and entitled "Zero Phase Start Compensation for VCO". These prior approaches have not fully satisfied the requirements for a high performance, multi-mode timing loop for synchronizing data recovery in a sampled data system.

SUMMARY OF THE INVENTION

A general object of the present invention is to provide an improved timing control loop architecture for a PR4, ML data channel.

Another object of the present invention is to provide a rapidly acting frequency and phase timing acquisition control loop within a PR4, ML data channel of a disk drive which also includes embedded sector servo and-/or zoned data recording techniques, so that frequency and phase are rapidly adjusted following interruption by an embedded servo sector, or upon switching from one data zone to another. In this regard, a related object of the present invention is to provide a dual mode timing control loop within a PR4, ML data channel of a disk drive. A further related object of the present invention is to provide an improved method for generating and utilizing a VCO control signal within a dual mode timing loop of a PR4, ML data channel of a disk drive. One further related object of the present invention is to provide a zero phase restart phase lock loop within a data synchronizer of a PR4, ML data channel of a disk drive.

A related object of the present invention is to provide a multi-mode timing loop for synchronizing data recovery in a sampled data channel which reduces the required range of a timing DAC so that a fine resolution adjustment may be provided without requiring a DAC having a very wide dynamic range.

Another related object of the present invention is to provide a timing loop within a sampled data channel which reduces required acquisition time for sample clock recovery.

Yet another object of the present invention is to provide update rate scaling within a digital portion of a digital/analog timing loop for a sampled data detection channel which reduces the clocking speed and power consuption of a digital to analog converter.

Still a further object of the present invention is to provide a multi-mode timing loop within a disk drive data channel of the PR4, ML sampled data type which lends itself to zoned data recording techniques.

Yet another object of the present invention is to provide a multi-mode timing loop for a PR4, ML sampled data channel which reduces the likelihood of false phase lock.

Still one more object of the present invention is to provide a multi-mode timing control loop for a sampled data detection system which enables locking to a frequency reference without using circuitry associated with sample extraction and conditioning.

Yet another object of the present invention is to provide a multi-mode timing control loop for a sampled data detection system which enables separate loop compensation for non-sample times and for sample times, and facilitates use of a digital loop filter during sample times.

A still further object of the present invention is to provide a multi-mode timing control loop for a sampled data detection system which provides for rapid timing acquisition at the beginning of READ mode by obtaining raw timing samples directly from an analog to digital data sampler during a timing acquisition submode, and by obtaining conditioned data samples from a digital finite impulse response (FIR) filter thereafter during a data tracking submode.

Yet another object of the present invention is to provide an improved digital zero phase start circuit within a multi-mode timing control loop for a sampled data detection system which reduces starting phase error in the control loop when acquiring lock to the data samples so that acquisition time is reduced.

A still further related object of the present invention is to provide zero phase start circuitry and methods which avoid starting control loop timing acquisition in a manner otherwise resulting in "unstable equilibrium" as described in the IBM articles noted above.

In accordance with aspects and features of the present invention, a multi-mode timing loop for a PR4,ML sampled data channel is disclosed. The channel includes an analog to digital converter for providing raw digital samples of data and a digital finite impulse response filter connected downstream of the converter for providing conditioned digital samples. The timing loop comprises a reference clock source for putting out a reference clock frequency related to a nominal sample rate for sampling data in said channel, a frequency controllable oscillator connected to receive said reference clock frequency and to generate a sample clock, an analog timing loop and a digital timing loop. The analog loop includes a phase detector for detecting and putting out a phase error between the reference clock frequency and the sample clock, a charge pump connected to receive the phase error and pump charge during a non-data read mode of operation, and an analog loop filter and charge store connected to receive charge pumped by said charge pump during non-data read mode and to hold the charge during a data read mode of operation, the analog loop filter for putting out an analog timing error value to the frequency controllable oscillator. The digital timing loop includes a timing error extractor connected to extract timing error values from the digital samples, a digital timing loop filter for filtering the timing error values, and a timing digital to analog converter for converting the filtered timing error values into analog vernier timing correction values and for supplying them to the frequency controllable oscillator during the data read mode. In this manner the analog timing loop provides phase lock during non-data read mode, and during the data read mode the digital timing loop provides a vernier offset for fine adjustment of phase lock to a static setting then provided by the analog timing loop means at the frequency controllable oscillator.

In accordance with further aspects and features of the present invention, a method is provided for timing a PR4,ML sampled data channel including an analog to digital sampling and conversion circuit for providing raw digital samples of data at a sample clock rate and a digital finite impulse response filter circuit connected downstream of said analog to digital sampling and conversion circuit for providing conditioned digital samples at the sample clock rate. The timing method comprises the steps of:

putting out a reference clock frequency related to a nominal sample clock rate for sampling data in said channel, generating and putting out the sample clock, detecting and putting out an analog phase error between said reference clock frequency and said sample clock, charging a storage means with a charge related to said phase error during a non-data read mode, filtering and converting said charge into an analog timing control value and applying said analog timing control value to control the frequency of said sample clock during the non-data read mode and during a data read mode receiving said digital samples from said finite impulse response filter circuit and extracting timing error values therefrom, filtering said timing error values, converting said filtered timing error values into analog vernier timing correction values and supplying said analog vernier timing correction values to adjust the frequency of said sample clock during the data read mode.

As one further aspect, an additional step of the method calls for dividing the digital samples by a predetermined divisor, such as two, and for supplying a value related to a resultant quotient to adjust the frequency of said sample clock during the data read mode.

As a further aspect, additional steps of the method call for:

detecting a predetermined phase within an analog data stream received by said analog to digital sampling and conversion circuit, and stopping and restarting a controllable oscillator circuit generating the sample clock in response to the step of detecting the phase of the analog data stream. In carrying out this further aspect, the steps may further include:

comparing reference amplitude axis crossings of analog signals in the analog data stream and putting out a start control, delaying the start control by a fixed delay period to provide a delayed start control, and stopping and then restarting operation of the controllable oscillator circuit at a controllable instant following the delayed start control.

These and other objects, advantages, aspects and features of the present invention will be more fully understood and appreciated upon consideration of the following detailed description of a preferred embodiment, presented in conjunction with the accompanying drawings.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

SYSTEM OVERVIEW

Figure 4:
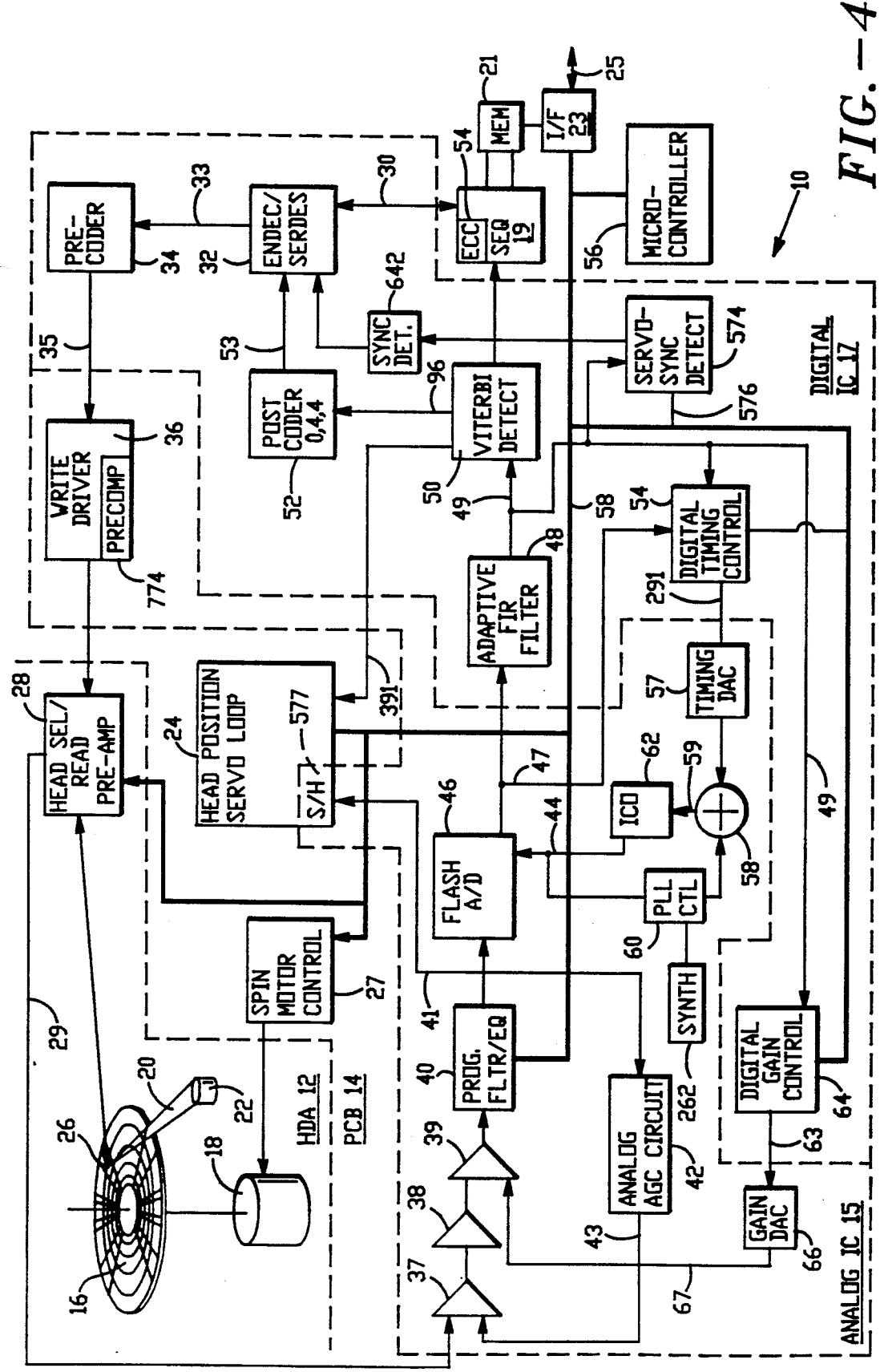
FIG. 4 is a simplified overall system block diagram of a disk drive including a PR4, ML write/read channel architecture incorporating principles and aspects of the present invention.

With reference to FIG. 4, an exemplary high performance, high data capacity, low cost disk drive 10 incorporating a programmable and adaptive PR4, ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4, ML read/write channel application-specific integrated circuit (ASIC) 15, a digital PR4, ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 58 for controlling operations of the sequencer 19, interface 23, a servo loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include on-board and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4, ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head positioner, now U.S. Pat. No. 5,170,299, the disclosure thereof being hereby incorporated by reference.

Returning to FIG. 4, during playback, flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$.

Figure 1:
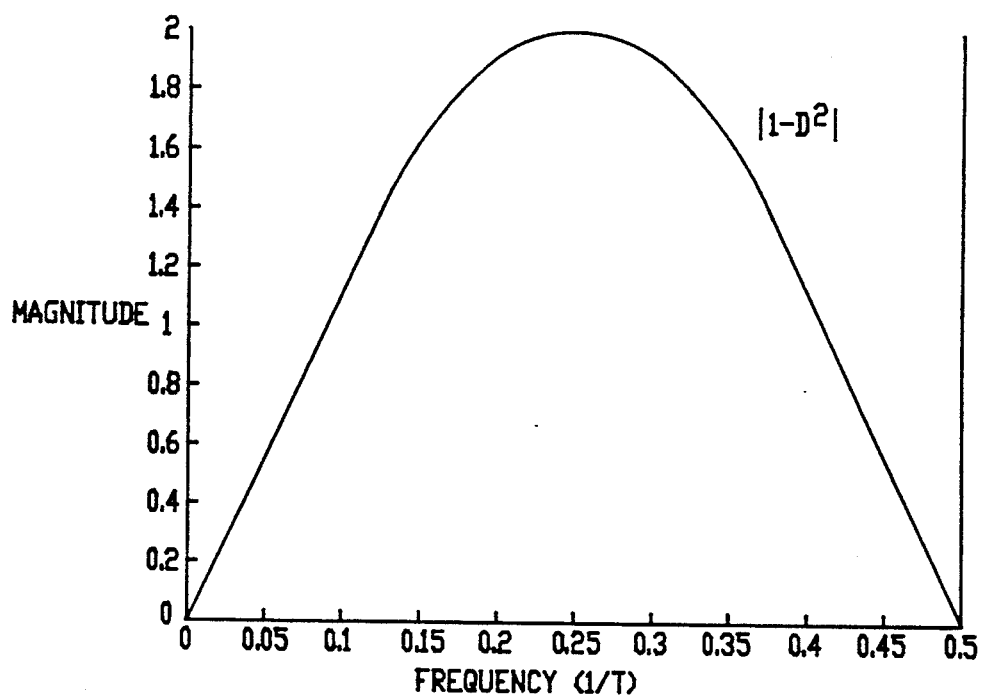
FIG. 1 is a graph of an idealized PR4 channel magnitude response spectrum.
Figure 2:
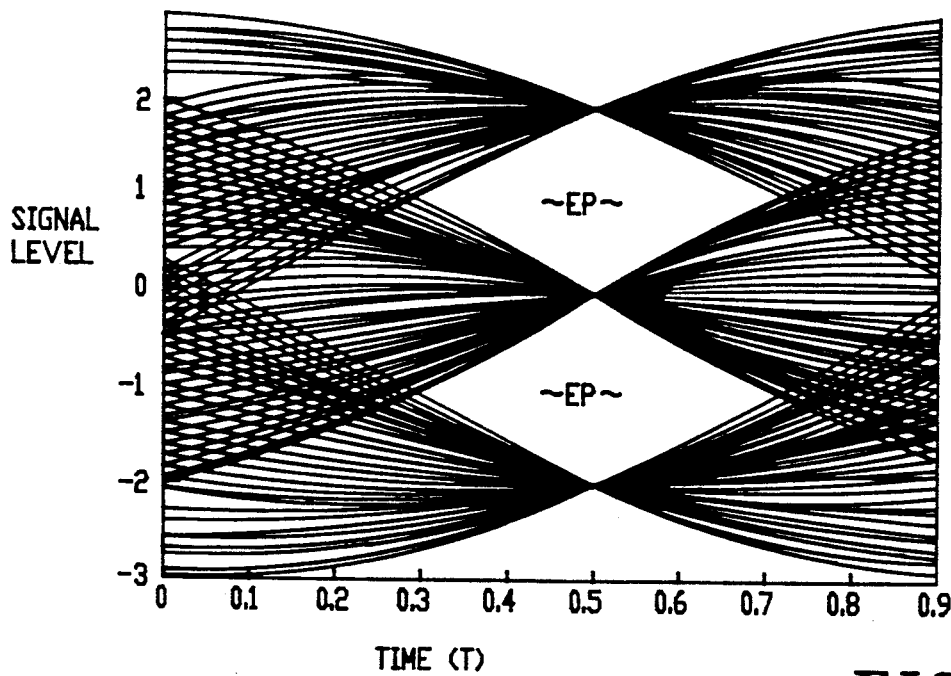
FIG. 2 is an exemplary ternary or "eye" diagram illustrating detection of signal levels in a PR4 channel.
Figure 3:
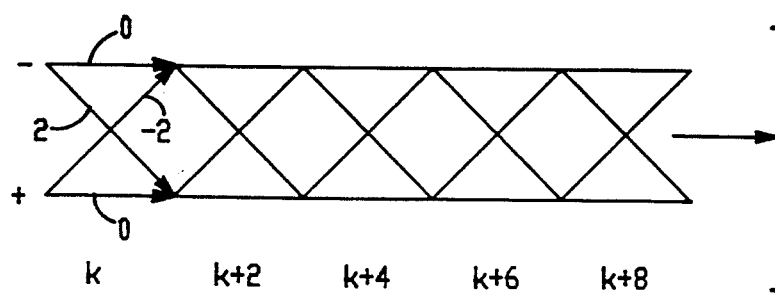
FIG. 3 is a trellis diagram employed by a Viterbi detector in detecting a maximum likelihood data sequence occurring within one interleave of a PR4 data stream.

The FIR filter 48 employs adaptive filter coefficients for filtering and conditioning the raw data samples $\{x_k\}$ in accordance with the desired PR4 channel response characteristics, as plotted in FIG. 1, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example. At this stage, the decoded data put out on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples $\{x_k\}$ must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls the current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

Figure 5:
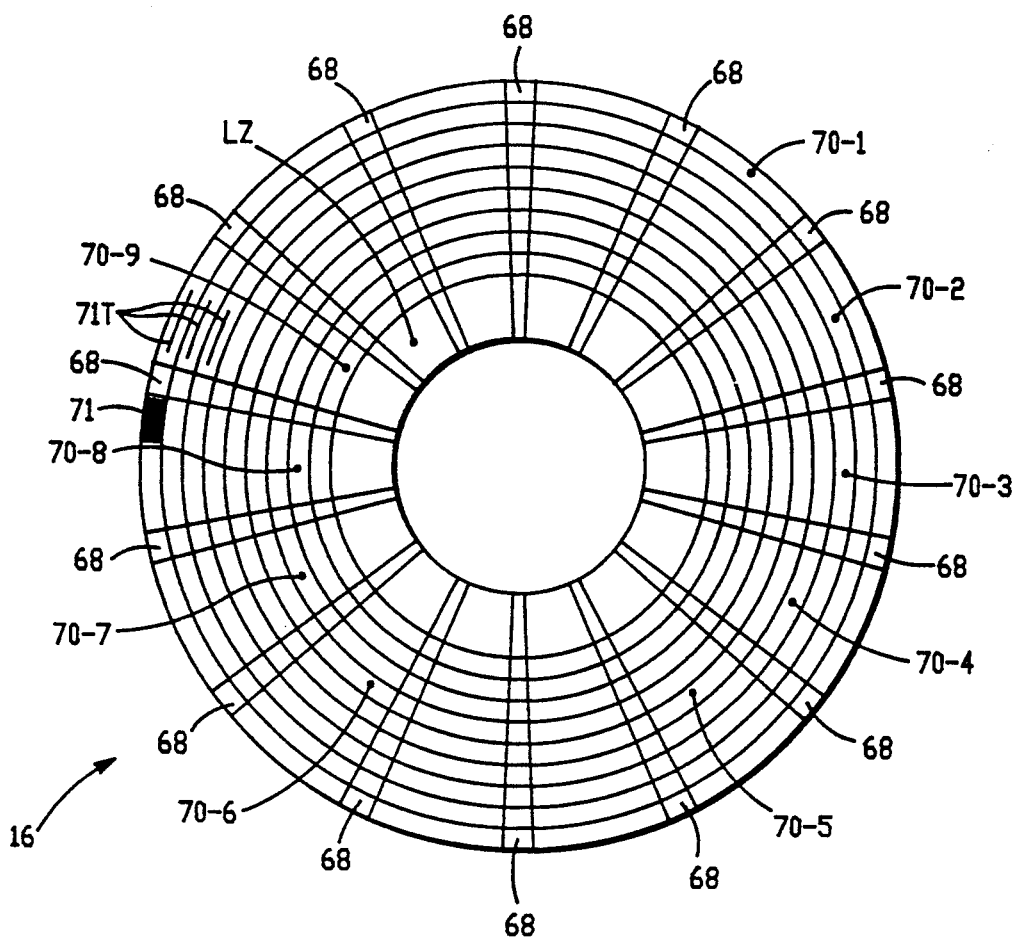
FIG. 5 is a simplified diagram of a recording pattern formed on a data storage surface of the FIG. 4 disk drive, illustrating data zones and embedded servo sector patterns.

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

Figure 6:
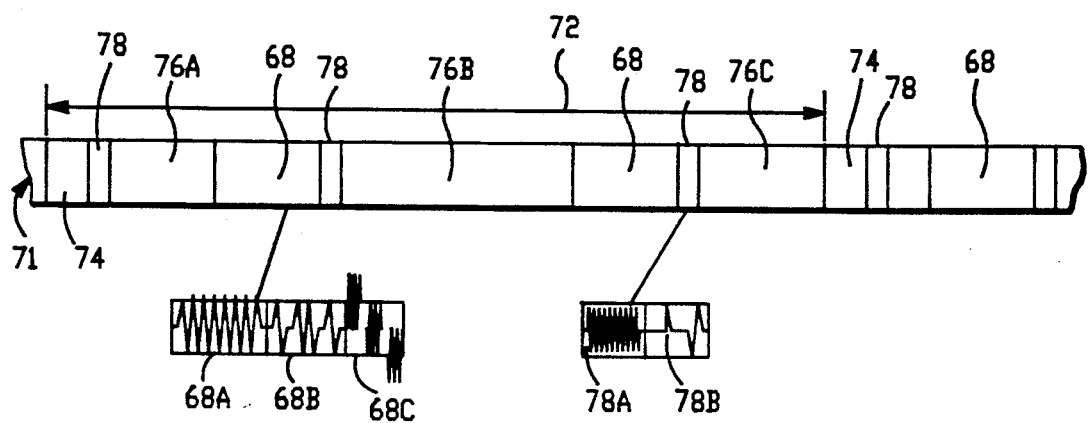
FIG. 6 is an enlarged lineal depiction of a segment of one data track within the multiplicity of data tracks defined within the FIG. 5 data layout plan, illustrating one data field which has been split into segments by regularly occurring embedded servo sectors.

FIG. 5 also depicts a series of radially extending embedded servo sectors 68 which e.g. are equally spaced around the circumference of the disk 16. As shown in FIG. 6, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors of fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the referenced, copending U.S. patent application Ser. No. 07/569,065.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

MULTI-MODE TIMING LOOP

In a sampled data system such as PR4, ML, it is necessary to sample and quantize the incoming analog information with the flash A/D converter 46 at predetermined proper sampling times. In order to perform properly timed sampling, it is necessary to generate a clock for the A/D converter 46 which is properly synchronized and phase aligned with the incoming data stream. The multi-mode timing loop implements automatic, rapid frequency and phase alignment with the incoming data in order to carry out sampling correctly.

As shown in FIG. 4, the multi-mode timing loop comprises the combination of an analog-based timing loop including the analog phase locked loop control circuit 60, the timing summing junction 58, and the ICO 62 which controls the timing of samples taken and put out by the flash A/D 46; and, a digital-based timing loop including the digital timing control circuit 54, the timing DAC 57, the summing junction 58 and the ICO 62. The multi-mode timing loop has two main operating modes: non-read and data read. During non-read, the timing is controlled by the analog based timing loop. During read mode, when timing is controlled through the digital timing control circuit 54, there are two submodes: acquisition and tracking. In the acquisition mode, raw data samples $\{x_k\}$ are taken from the path 47 between the flash A/D 46 and the FIR filter 48. During tracking, conditioned data samples $\{y_k\}$ are taken from the path 49 between the FIR filter 48 and the Viterbi detector 50. Non-read mode will be discussed first.

Figure 7:
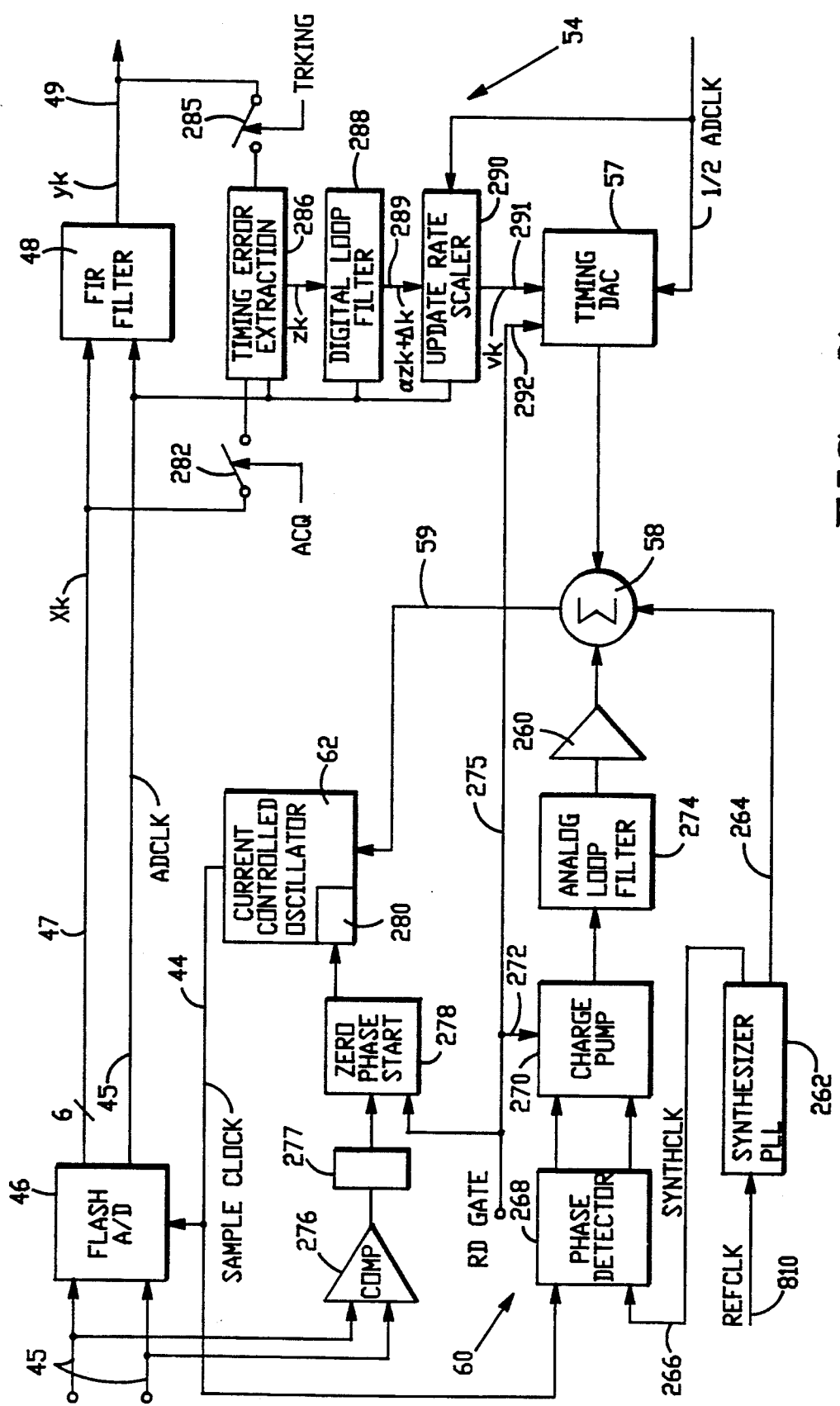
FIG. 7 is a functional block diagram of a multi-mode timing loop of the FIG. 4 disk drive architecture in accordance with aspects of the present invention.

With reference to FIG. 7, during non-read mode, the frequency synthesizer 262 receives a reference clock frequency REFCLK over a path 810 from a clock source thereof, such as a crystal oscillator operating at the basic system clocking rate. The synthesizer 262 generates a plurality of predetermined frequencies corresponding to the respective data rates of the data zones 70-1 to 70-9, for example, and puts out a synthesizer current reference value over a path 264 to the timing summing junction 58, which passes it to the ICO 62 over a path 59. (The timing DAC 57 in the digital-based timing loop is not enabled during non-read mode). The synthesizer 262 also puts out a synthesizer clock signal SYNTHCLK on a path 266.

The SYNTHCLK signal on the path 266 enters a phase detector 268 wherein it is compared with the ICO clock signal (SAMPLECLK) provided over the path 44 from the ICO 62. The phase detector 268 puts out a phase error signal to control an analog charge pump 270. When enabled by an enable signal on a path 272 which is derived from RDGATE 275, an output from the charge pump 270 passes into an analog loop low pass filter 274. The loop filter 274 includes a charge storage device which accumulates and stores a value established by the charge pump 270. A transconductance amplifier/buffer 260 converts the timing error signal voltage held on the charge storage device into a current level and applies it as another input to the analog current summing junction 58.

When the timing loop is in the non-read mode, a read gate signal (RDGATE) on the path 275 will be false, and the enable signal 272 will be true, thereby establishing a direct signal path between the analog charge pump 270 and the analog loop filter 274. Thus, during the non-read mode, the charge pump 270 charges up the charge storage device in the loop filter 274. At the same time, another enable 292 (also derived from the RDGATE signal on the path 275) sets the DAC 57 to a reference level. The signal put out from the summing junction 58 is a sum of the signals received from the synthesizer 262 on the path 264, the analog error signal from the buffer 260, and the reference current from the DAC 57. This analog current error sum is applied over the path 59 directly to control the ICO 62 which in turn generates and puts out a SAMPLE CLOCK signal on a path 44 to the flash A/D 46 and the phase detector 268 over the path 44. Operation of the analog timing loop including the synthesizer 262, summing junction 58, ICO 62, phase detector 268, charge pump 270, analog loop filter 274 and buffer 260 results in phase lock of the SAMPLECLK signal to the synthesized clock frequency SYNTHCLK put out by the frequency synthesizer PLL 262. Ordinarily, the timing loop remains in non-read mode unless or until user data is to be read back from a disk surface. Data write-to-disk operations are timed directly by the synthesizer 262. Recovery of servo sector data samples is timed asynchronously by supplying REFCLK directly to the flash A/D 46.

Figure 8:
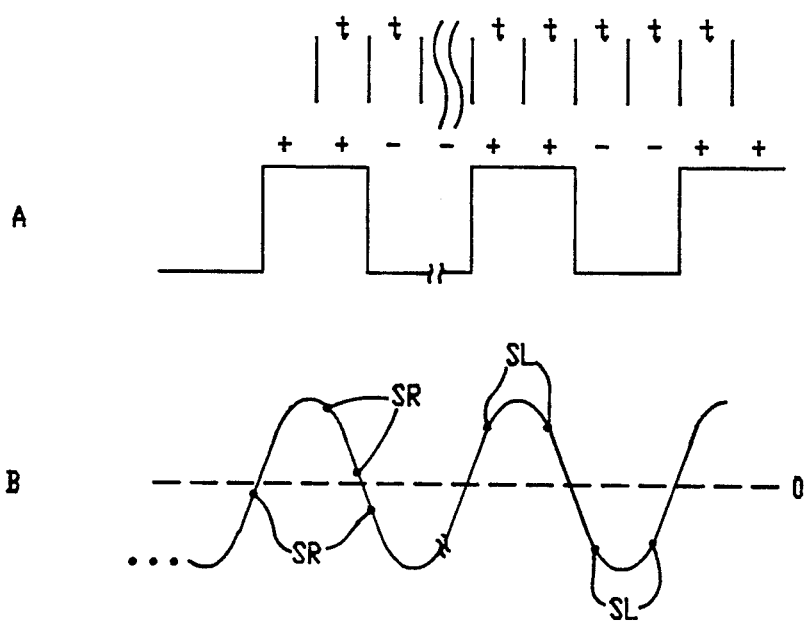
FIG. 8 is a series of waveform graphs illustrating write current and readback signals of a preamble field of the data track pattern of FIGS. 5 and 6, illustrating timing loop synchronization.

Read mode is entered whenever PR4, ML user data is to be read from the disk surface. At the beginning of every recorded data segment e.g. 76A, 76B and 76C, the data header 78 includes a constant frequency data pattern field 78A (such as an AGC field). This pattern is recorded in accordance with a square wave saturated recording current of the type illustrated in FIG. 8, graph A. During playback, the head 26 processes the detected flux transitions such that playback resembles a sinewave as shown in FIG. 8, graph B.

The preamble pattern is used to start the timing loop on a good initial starting phase, and to synchronize the read clock to the data pattern to be read. The playback response of the preamble pattern is also used to set the initial gain settings as is conventional with AGC fields such that when the data cell pattern leaves the FIR filter 48, a nominal ternary (i.e. three level) signal is present.

At the beginning of playback of the preamble pattern, the read gate signal (RDGATE) on the path 275 changes logical state such that the analog enable signal 272 becomes false while the digital path enable signal 292 becomes true. At the beginning of the acquisition mode, the flash analog to digital converter 46 is sampling the incoming waveform at approximate sample locations along its locus (depending upon the accuracy of zero phase start circuitry 278), such as at locations SR in FIG. 8, graph B. During acquisition mode, the timing phase locked loop (PLL) thus comprises the timing control block 54 (including a timing error extraction function 286, a digital PLL loop filter function 288, and an update rate scaler function 290), the DAC 57 and its enable control 292, the summing junction 58, the current controlled oscillator 62 and the flash A/D 46.

In this initial timing acquisition mode raw data samples $\{x_k\}$ are input to the timing error extraction function 286 directly from the output of the flash A/D 46 via a path diagrammatically indicated as a closed switch 282, since the FIR filter 48 may not yet be adapted to an optimal response for the particular data zone from which user data is to be read back, and also to avoid the processing latency through the FIR filter 48 and resultant delay in timing loop phase lock. The timing error extraction function 286 generates and puts out a sampling phase error estimate $z_k$ based upon the difference between desired timing and present timing.

The error metric $z_k$ put out from the timing error extraction function 286 is then passed through a digital loop filter function 288. The resultant low pass filtered error metric, described by the relation $\alpha z_k + \Delta_k$ is then passed through the update rate scaler function 290 which processes and puts out sample group error metric estimates $v_k$ at e.g. one half of the initial error metric clocking rate. By using a one half rate for the error metric being fed to the DAC 57, and by clocking the DAC 57 at a ½ ADCLK rate, improvements in power consumption and noise immunity are realized at the digital to analog interface. Basically, two successive error metric samples are averaged, and the average is put out. The overhead attributable to the process within the update rate scaler function amounts only to one additional clock cycle of latency at the sample rate, which does not significantly degrade the convergence time.

The acquisition timing error estimate is described by the following:

$$z_k^a = -x_k \hat{x}_{k-1} + \hat{x}_{k-1} \hat{x}_k \quad (1)$$

Within the timing error extraction function, the following relation is obtained:

$$\hat{x}_k = \text{signum}(x_k - \eta_k) \quad (2)$$

where signum $(x) = +1$ for $x \geq 0$ and $-1$ for $x < 0$, and $$\eta_k = E \cdot \hat{x}_{k-2}, \quad (3)$$

where E is a programmable constant. The digital low pass filter function generates the following:

$$\Delta_{k+1} = \Delta_k + \beta z_k \quad (4)$$

The scaling function $\alpha$ in acquisition mode is defined by the following:

$$\alpha^a = 2^{-n1} + 2^{-n2} \quad (5)$$

where n1 lies between 0 and 7 and n2 lies between 1 and 8. The scaling function $\beta$ in acquisition mode is defined by the following:

$$\beta^a = 2^{-m1} + 2^{-m2} \quad (6)$$

where m1 lies between 1 and 8, and m2 lies between 2 and 9.

The update rate scaler function 290 provides the sample group error metric estimates $v_k$ in accordance with the following function:

$$v_k = \tfrac{1}{2}[(\alpha z_k + \Delta_k) + (\alpha z_{k-1} + \Delta_{k-1})] \quad (7)$$

for even timing samples and $$v_k = v_{k-1} \quad (8)$$

for odd timing samples, thereby halving the clocking rate for the error metric being supplied to the timing DAC 57.

When enabled by the enable signal 292, the timing DAC 57 converts the scaled sample group error metric estimates $v_k$ into analog current values and applies those values through a direct path to the timing summing junction 58. At the same time, the non-read mode reference value stored in the charge storage element of the analog loop filter 274 is also applied as a current to the summing junction 58 as a static starting reference for the particular data zone. In this manner, the error metric signal supplied by the DAC 57 acts as a vernier control so as to adjust the held (but no longer updated) static reference value. This approach, which comprises one aspect of the present invention, enables the current controlled oscillator 62 to be operating at very nearly the appropriate frequency when it is switched from non-read mode to read mode (acquisition sub-mode). This approach thus reduces the amount of ICO adjustment, required and speeds up the acquistion time. Any slow discharge of the value held in the charge storage device of the analog loop filter 274 may be compensated for by slowly adjusting the digital input to the DAC 57. This adjustment is minor and is well within the dynamic range of the DAC 57 which is operating at one half of the original error metric clocking rate (SAMPLE CLOCK on the path 44).

The timing acquisition sub-mode has a duration which generally corresponds to a time during which the head 26 passes beneath the constant frequency data ID preamble field 78A. Once this predetermined time interval has passed and samples have been taken of the preamble field 78A, the switch 282 opens, and another switch 285 is closed, thereby switching the input of the digital timing error extraction circuit 286 from the raw samples $\{x_k\}$ from the A/D converter 46 to conditioned samples $\{y_k\}$ from the FIR filter 48.

The tracking mode timing error estimate is described by the following:

$$z_k{}^t = -y_k \hat{y}_{k-1} + y_{k-1} \hat{y}_k \quad (9)$$

Within the timing error extraction function, the following relation is obtained:

$$\hat{y}_k = 1 \text{ if } y_k > THP \quad (10)$$
$$0 \text{ if } -THP \leq y_k \leq THP, \text{ and}$$
$$-1 \text{ if } y_k < -THP$$

where THP is a programmable threshold. The digital low pass filter function provided by equation (4) above generates the same function during tracking as during acquisition, with the exception that $z_k{}^t$ of equation (9) is used in place of $z_k{}^a$ of equation (1) and $\beta$ is different. The scaling function $\alpha$ in tracking mode is defined by the following:

$$\alpha^t = 2^{-n3} + 2^{-n4} \quad (11)$$

where n3 lies between 0 and 7 and n4 lies between 1 and 8. The scaling function $\beta$ in tracking mode is defined by the following:

$$\beta^t = 2^{-m3} + 2^{-m4} \quad (12)$$

where m3 lies between 1 and 8, and m4 lies between 2 and 9. The update rate scaler function 290 similarly provides the sample group error metric estimates $v_k$ during tracking mode in accordance with the same function (7) as is employed during acquisition mode, with the above terms changed accordingly for tracking. The tracking values result in a narrower bandwidth timing loop, with superior signal to noise ratio during tracking mode, thereby providing increased stability and robustness during data tracking operations of the disk drive 10.

Figure 9:
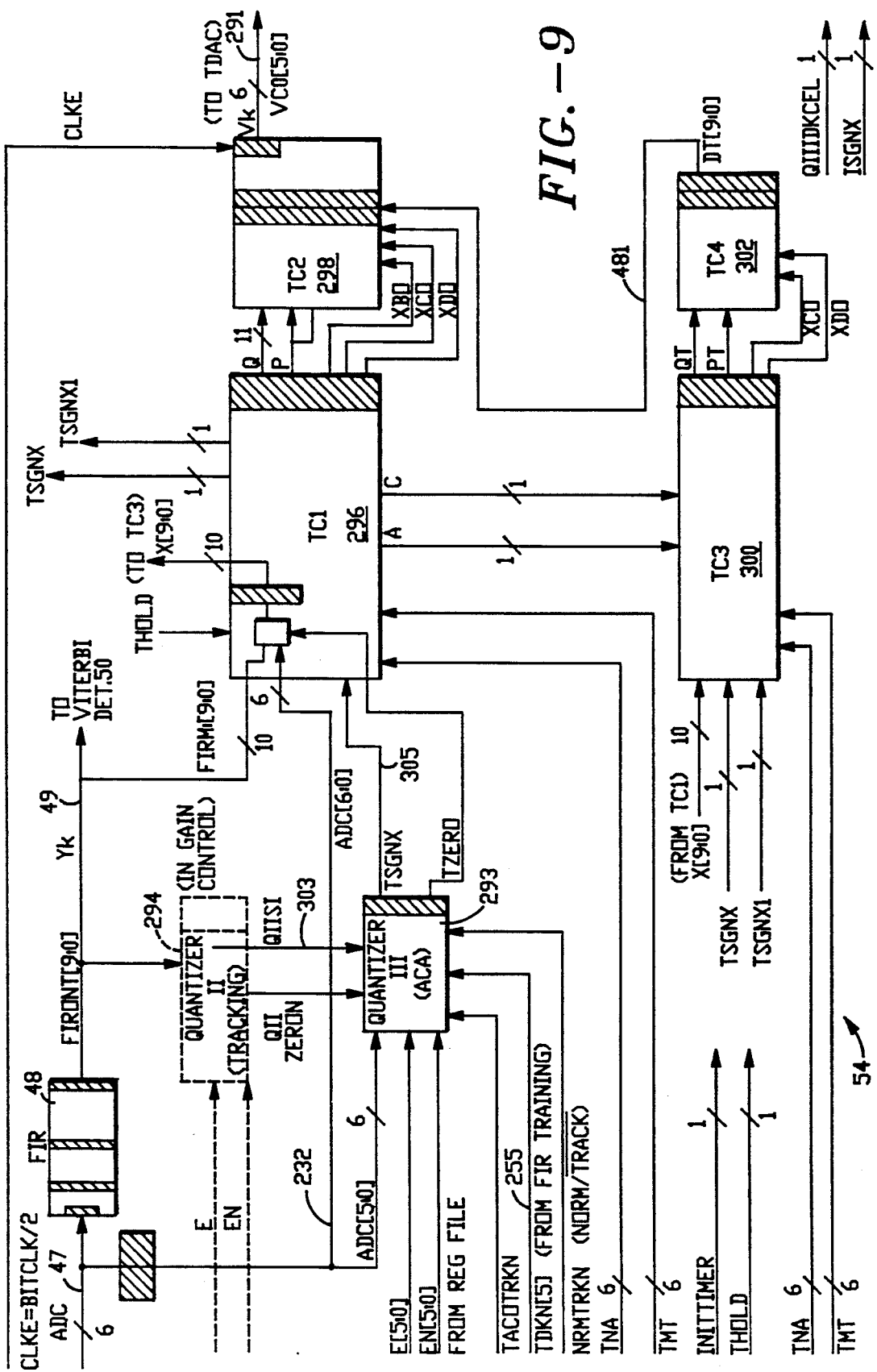
FIG. 9 is a structural block diagram of a portion of the digital timing control block shown in FIG. 4 and in greater functional detail in the FIG. 7 block diagram.

FIG. 9 sets forth a more detailed overview block diagram of the timing control circuit 54 including the error extraction function 286, digital loop filter function 288 and update rate scaler function 290. It will be immediately apparent to those skilled in the art that the error extraction function, digital loop filter function 288 and update rate scaler function 290 are distributed throughout the circuit blocks summarized in the FIG. 9 overview and that there is no block by block correlation with these three functions. Also, in FIG. 9 the switches 282 and 284 are seen to be implemented within two quantizer circuits, an acquisition quantizer 293 (shown in FIG. 10) and a tracking quantizer 294 (shown in FIG. 11).

The acquisition quantizer 293 calculates and puts out sgn($\hat{x}_k$) values on a path 301 during acquisition mode, and the quantizer 294 calculates and puts out $\hat{y}_k$ values on a path 303 to quantizer 293 during tracking mode. One of these values, as selected by the multiplexers 314 and 316 and put out on a path 305, together with undelayed values $x_k$ (during acquisition) and $y_k$ (during tracking), feed into a first timing calculation circuit 296. The first timing calculation circuit 296, described in greater detail in FIG. 12, performs part of the calculations described above and passes partial results to a second timing calculation circuit 298 described in greater detail in conjunction with FIG. 13, and also to a third timing calculation circuit 300 described in conjunction with FIG. 14. The third timing calculation circuit 300 feeds partial results to a fourth timing calculation circuit 302 shown in, and described in conjunction with, FIG. 16 which provides an output path back to the second timing calculation circuit 298.

Figure 10:
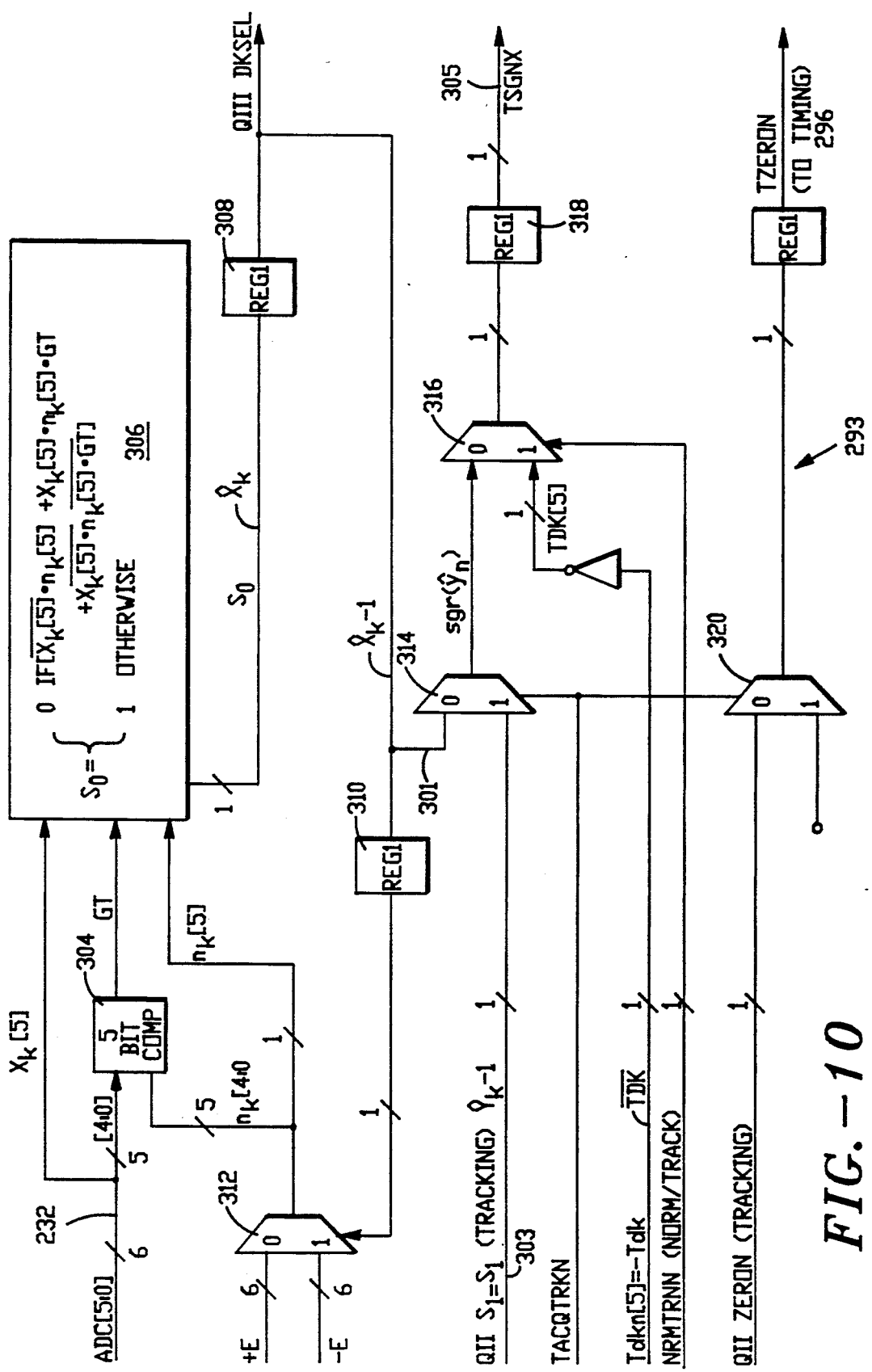
FIG. 10 is a detailed block diagram of an acquisition mode quantizer circuit block shown in the FIG. 9 block diagram.

Turning now to FIG. 10, the acquisition quantizer 293 includes a five-bit comparator 304 which receives five low order bits of the unconditioned digital samples directly from the flash analog to digital converter 46 via the path 47. A high order sign bit enters a logic array 306 which generates the function $\hat{x}_k$ in accordance with formula (6) above. This value is delayed by a register delay 308 and fed back on the path 301 through a second register delay 310 to yield $\hat{x}_{k-2}$, a binary value used to control a multiplexer 312 which multiplies programmable constants $+E$ and $-E$ which are held in the register file 804 of the digital IC 17 by the binary value $\hat{x}_{k-2}$ to yield $\eta_k$, a five-bit value. The resultant value $\eta_k$ put out by the multiplexer 312 is supplied to the five-bit comparator 304 and to the logic array 306.

Figure 12:
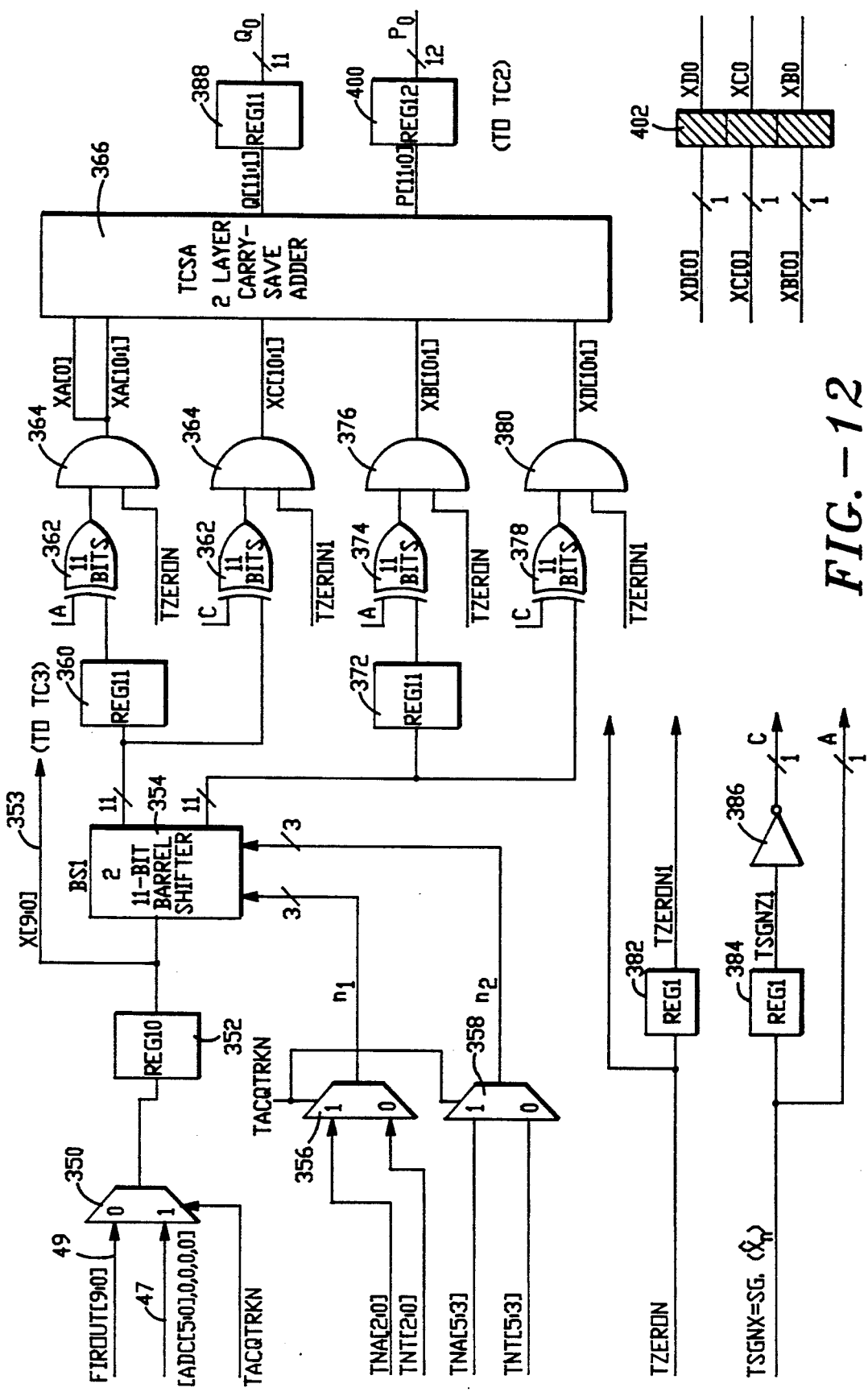
FIG. 12 is a detailed block diagram of a first timing calculation circuit block shown in the FIG. 9 block diagram.

The resultant value $\hat{x}_{k-1}$ is selected during acquisition mode by the acquisition/tracking mode multiplexer 314, and by the normal/training mode multiplexer 316, and a register delay 318 which yields the sgn($\hat{x}_k$) value (during acquisition) or sgn($\hat{y}_k$) (during tracking). This selected value is put out on the path 305 which extends to the first timing calculation circuit 296 (FIG. 12). Another multiplexer 320 selects between a tracking zero value TZERON and 1 in accordance with an acquisition/tracking mode selector signal TACQTRKN which also controls the multiplexer 314. A register delay 322 delays the output from the multiplexer 320 by one clock cycle, and provides the delayed output TZERON to the first timing calculation circuit 296.

Figure 11:
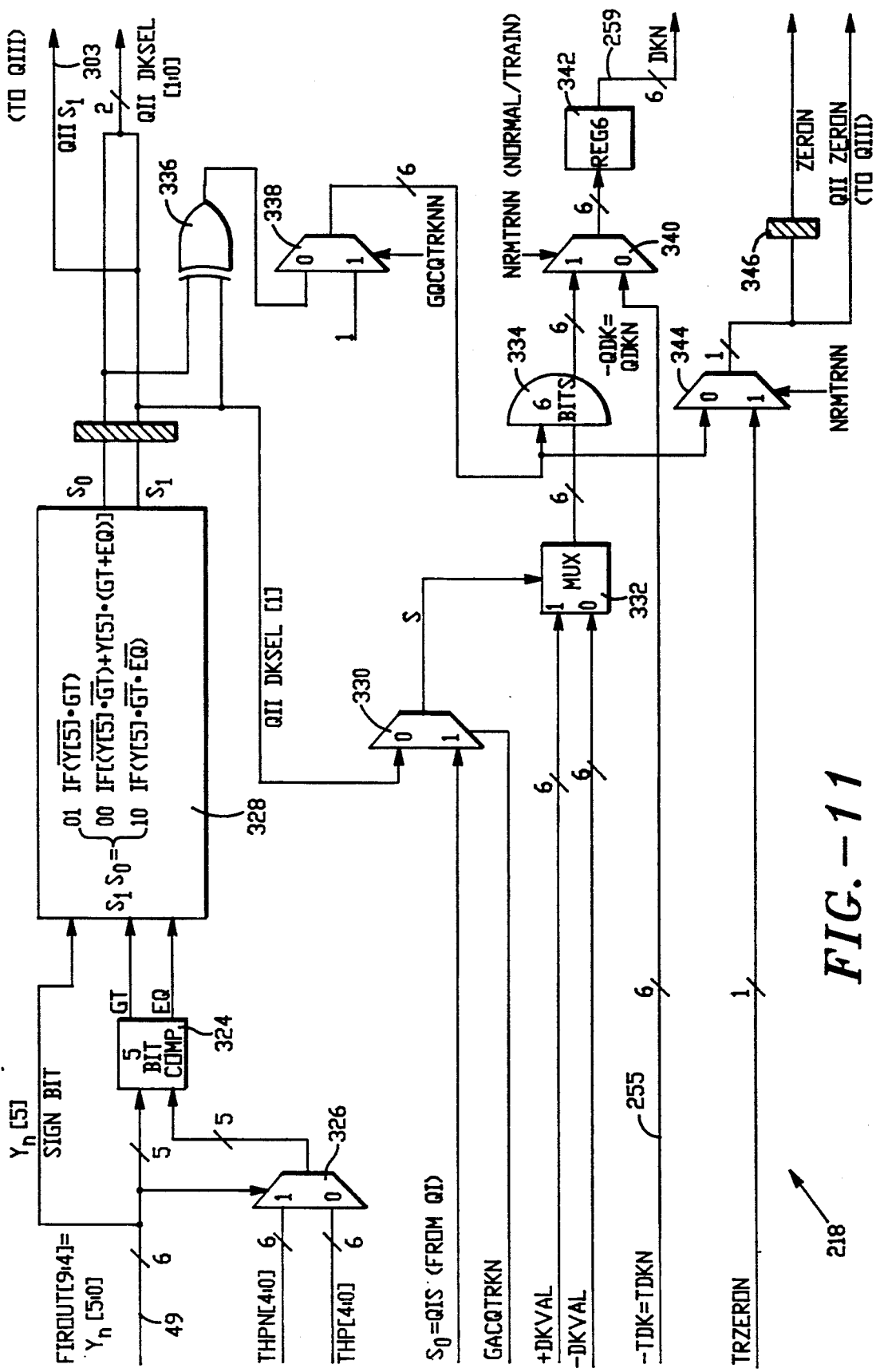
FIG. 11 is a detailed block diagram of a tracking mode quantizer circuit block shown in the FIG. 9 block diagram.

The tracking quantizer 294 is shown in FIG. 11 as including a five-bit comparator 324 which receives via the path 49 the five low order bits of the digital samples $y_k$ which have been conditioned by passing through the adaptive FIR filter 48. At the same time a high order sign bit controls a multiplexer 326 which selects between positive and negative programmable threshold values +THP and −THP which are stored in the register file 804 of the digital IC 17. The result of the comparison provided by the circuit 324 and the logic array 328 is $y_k$ in accordance with equation (10). This value is passed back to the acquisition quantizer 293 over the path 303 and is selected and put out by the multiplexer 314 during tracking mode.

In addition, a second value dksel is passed through a multiplexer 330 during tracking mode and used to control a six-bit multiplexer 332 which selects between positive and negative reference values +dkval and a −dkval which are part of the digital gain loop. The selected dkval is passed through an AND gate 334 which ands a high order bit from a selector 338 with the values put out by the multiplexer 332. The high order bit from the selector is provided by an exclusive OR gate 336 which compares the bit values S0 and S1 put out by the logic array 328. A selector 340 selects between the selected dkval signals and a six-bit $\overline{TDK}$ value, depending upon whether the FIR filter is in normal mode or is in training mode. A six bit delay register 342 provides one clock cycle delay to the output from the selector 340 and passes the delayed VALUE to other digital circuitry of the gain loop over the path 259. A single bit selector 344 and a delay register 346 provide the ZERON signal to the selector 320 of the acquisition quantizer 293.

Turning to FIG. 12, the first timing calculation circuit 296 includes a selector 350 which selects between the conditioned digital samples $\{y_k\}$ on the path 49 from the FIR filter 48 during tracking mode, and the unconditioned samples $\{x_k\}$ from the flash A/D 46 during acquisition mode. The selected values are delayed by a register delay 352 and are then passed into a first barrel shifter 354 (described in greater detail in FIG. 17). Two selectors 356 and 358 select between acquisition and tracking scaling values, and the selected values are fed into the barrel shifter 354.

During acquisition mode, the barrel shifter 354 generates $\alpha 1 x_k$, and $\alpha 2 x_k$. A delay register 360 yields $\alpha 1 x_{k-1}$, and a delay register 372 yields $\alpha 2 x_{k-1}$. The delayed value from the register 360 passes through an exclusive OR gate 362 and an AND gate 364 to reach a two-layer carry-save adder 366. The adder 366 is described in greater detail in FIG. 16. The undelayed $\alpha 1 x_k$ value from the barrel shifter 354 is passed through an exclusive OR gate 368 and an AND gate 370 before reaching the adder 366. The delayed $\alpha 2 x_{k-1}$ value from the register 372 passes through an exclusive OR gate 374 and an AND gate 376 before reaching the adder 366; and, the undelayed $\alpha 2 x_k$ value from the barrel shifter 354 passes through an exclusive OR gate 378 and an AND gate 378 before reaching the adder 366. During tracking mode the values $\{x_k\}$ are replaced by the values $\{y_k\}$.

The exclusive OR gates 362 and 374 compare the incoming values with A values, while the exclusive OR gates 368 and 378 compare the incoming values with C values. A sign decoder comprising a clock period delay 384 and an inverter 386 generates the C value from the A value in accordance with the following table:

| SIGN DECODER TABLE | | | |
|---|---|---|---|
| $\hat{x}_{k-1}$ | C | $\hat{x}_k$ | A |
| 0 (+1) | 1 | 0 (+1) | 0 |
| 0 (+1) | 1 | 1 (−1) | 1 |
| 1 (−1) | 0 | 0 (+1) | 0 |
| 1 (−1) | 0 | 1 (−1) | 1 |

Figure 13:
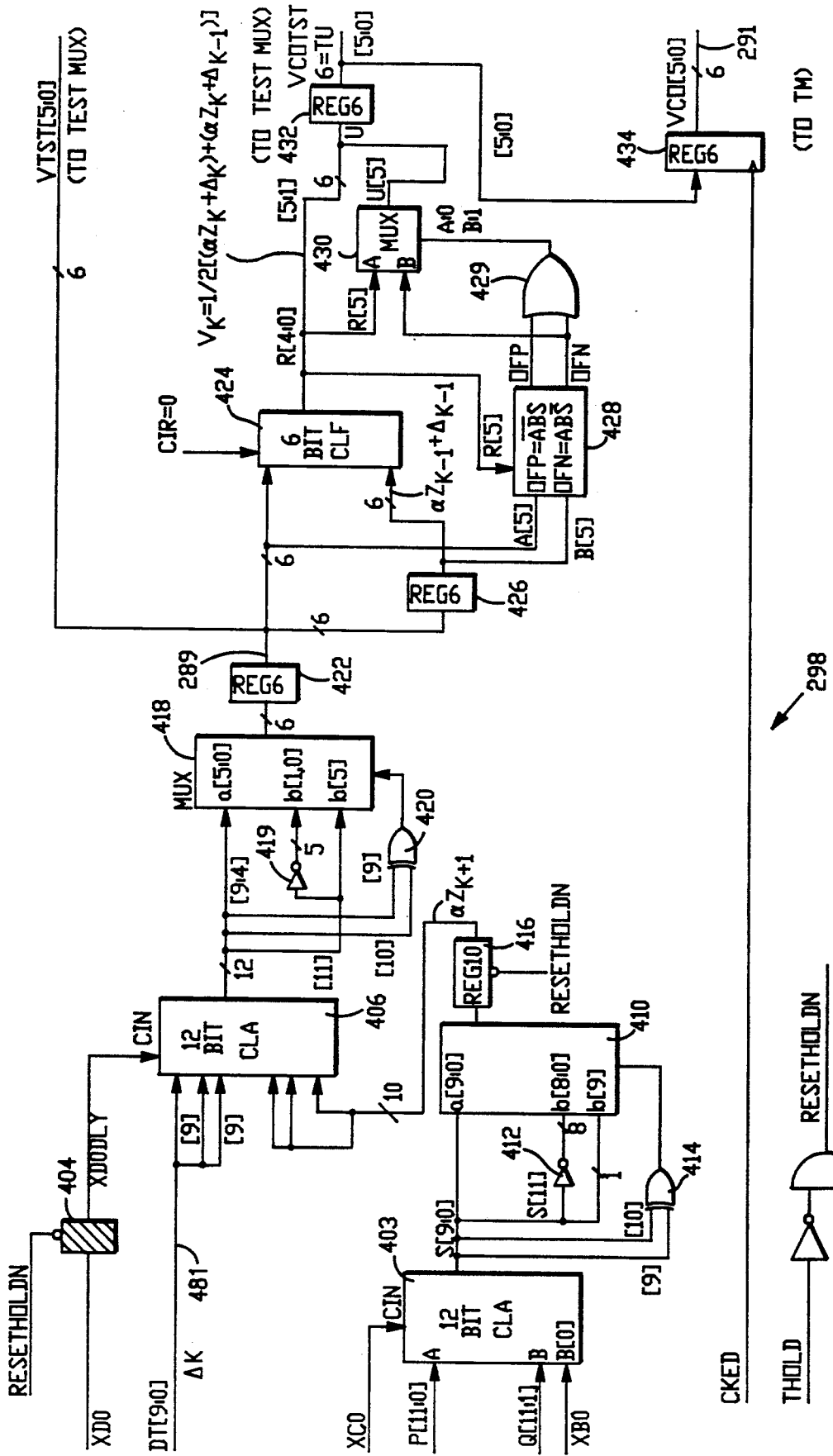
FIG. 13 is a detailed block diagram of a second timing calculation circuit block shown in the FIG. 9 block diagram.

The signal TZERON put out from the delay 322 of the acquisition mode quantizer 293 passes directly as an input to the AND gates 364 and 376. A clock delay register 382 delays the TZERON signal by one clock period and provides a delayed signal TZERON1 to the AND gates 370 and 380. The adder 366 thus combines the four inputs to provide two outputs Q and P which are sums of the four inputs. This operation is part of the calculation needed to arrive at the scaling function $\alpha$ per formula (5) during acquisition and per formula (11) during tracking. The Q value is delayed by a clock period delay 388 and the P value is delayed by a clock delay 400. The delayed Q and P values are then put out to the second timing calculation circuit 298 (FIG. 13). Values XB0, XC0 and XD0 are delayed by a clock period delay register 402 and are also put out the the second timing calculation circuit 298.

Turning now to FIG. 13, the second timing calculation circuit 298 receives the $\Delta_k$ term from the fourth timing calculation circuit 302 over a path 481. The ten-bit $\Delta_k$ term is sent into a 12 bit carry-lookahead adder 406 where it is combined with the $\alpha z_k$ term. This latter term is obtained from a logic array including a 12 bit carry-lookahead adder 408, and a ten bit selector 410. The adder 408 combines the Q and P values received from the first timing calculation circuit 296. A carry input is provided by the XC0 value, and a low order bit position for the Q value is provided by the XB0 value. A ten bit sum from the adder 410 is passed directly into one input of the selector 410, while the same sum is inverted by an inverter 412 and passed directly into the other input of the selector 410. An exclusive-OR gate 414 compares bit positions [9] and [10] of the sum to develop a sign value which is used to control the selector 410. A clock delay register 416 provides a delay to the $\alpha z_k$ term which is then applied to the carry-lookahead adder 406.

Bits [9:4] of the 12 bit sum put out by the adder 406 pass directly into a six bit multiplexer 418. Bit 11 is used to generate a saturation value that is applied to a second input of the multiplexer 418. An exclusive OR gate 420 develops a sign bit to control the multiplexer 418. A six bit delay register 422 delays the value put out by the multiplexer 418 by one clock cycle. During acquisition mode, the output from the register 422 comprises $\alpha z_k + \Delta_k$. A delay register 426 delays this value by one clock cycle, and provides the filtered timing error term $\Delta z_{k-1} + \Delta_{k-1}$ put out by the digital timing loop filter function 288 (FIG. 7). A six-bit carry lookahead adder 424 combines these two terms to yield a sum thereof. An overflow circuit comprising a logic array 428, an OR gate 429 and a multiplexer 430 limits the range of the sum put out by the adder 424. Also, the update rate scaler function 290 is provided by selecting and passing bit positions [5:1] of the sum put out by the adder 424 through a latch 432, thus yielding the $v_k$ function of formula (7) for even timing samples. A register 434, clocked at one half of the data rate, is employed to provide the $v_{k-1}$ function of formula (8) for odd timing samples. The $v_k$ value put out from the register 434 is provided over the path 291 to the timing DAC 57.

Figure 14:
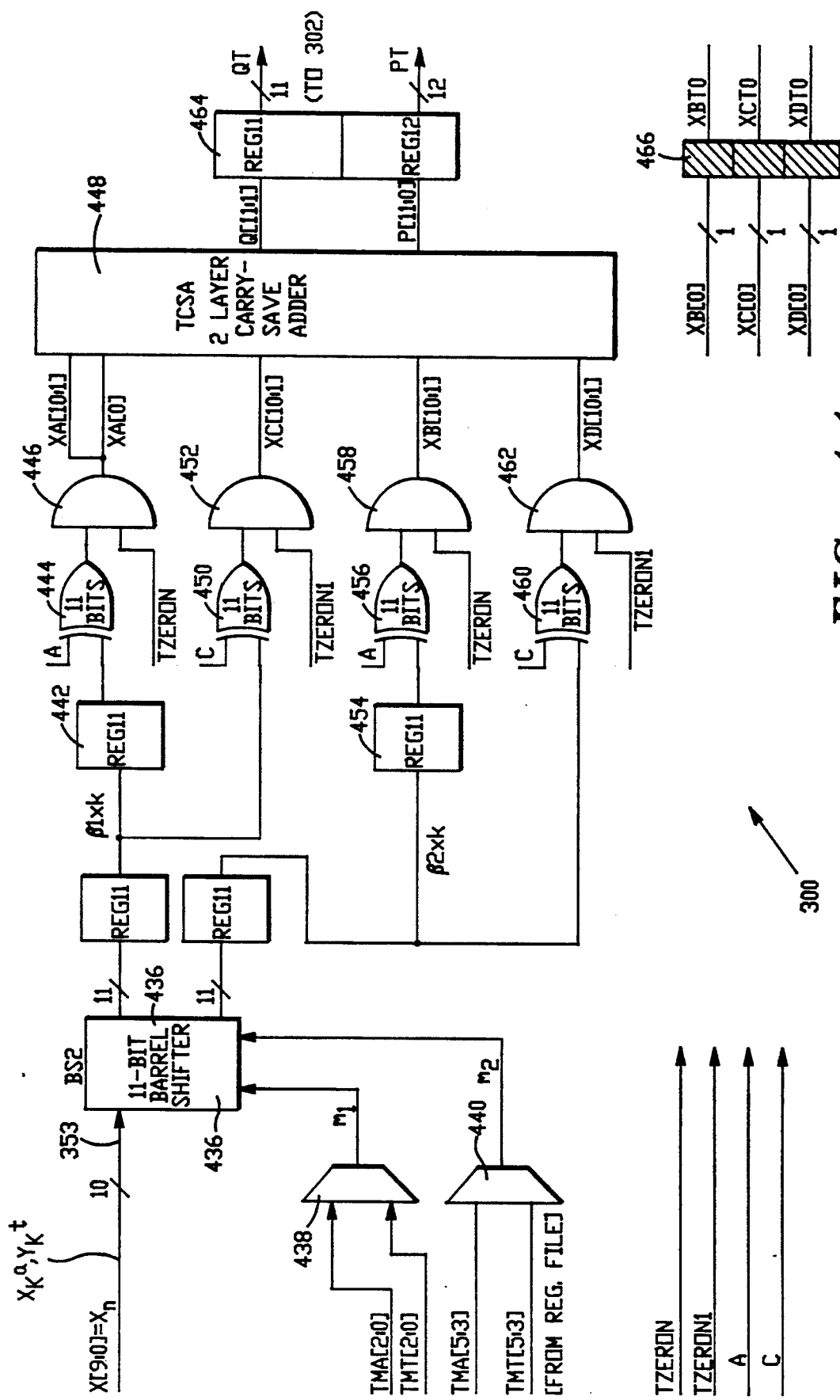
FIG. 14 is a detailed block diagram of a third timing calculation circuit block shown in the FIG. 9 block diagram.

The unconditioned data samples $\{x_k\}$ during acquisition, and the conditioned data samples $\{y_k\}$ during tracking are provided over a path 353 from the delay register 352 of the first timing calculation circuit 296 to the third timing calculation circuit 300 depicted in FIG. 14. These samples are put into a barrel shifter 436 which is illustrated in greater detail in FIG. 18. The scaling constants $2^{-m1}$ and $2^{-m2}$ (during acquisition) and $2^{-m3}$ and $2^{-m4}$ (during tracking) are passed from the register file 804 through selectors 438 and 440, and these constants are combined with the data samples in the barrel shifter 436 to provide the $\beta$ values of formulas (6) and (12).

A first value $\beta 1 x_k$ is passed through a delay register 442, an exclusive-OR gate 444, and an AND gate 446 before reaching a two layer carry save adder 448, also illustrated in greater detail in FIG. 30. An undelayed first value passes through an exclusive OR gate 450 and an AND gate 452 before reaching the adder 448. A second value $\beta 2 x_k$ passes through a delay register 454, an exclusive-OR gate 456 and an AND gate 458 before reaching the adder 448. An undelayed second value passes through an exclusive-OR gate 460 and an AND gate 462 before reaching the adder 448. The exclusive-OR gates 444 and 456 compare the incoming values with the A value explained above in conjunction with the first timing calculation circuit 296, while the exclusive OR gates 450 and 460 compare the incoming values with the C value similarly explained above. Similarly, the AND gates 446 and 458 combine the incoming values with TZERON while the AND gates 452 and 462 combine the incoming values with TZERON1, also previously explained in conjunction with the first timing calculation circuit 296. Outputs from the adder 448 are delayed by one clock period by a delay register 464 and then put out as values QT and PT to the fourth timing calculation circuit 302. Similarly, a register 466 delays single bit values XB0, XC0 and XD0 by one clock period and puts them out to the fourth timing calculation circuit 302.

Figure 15:
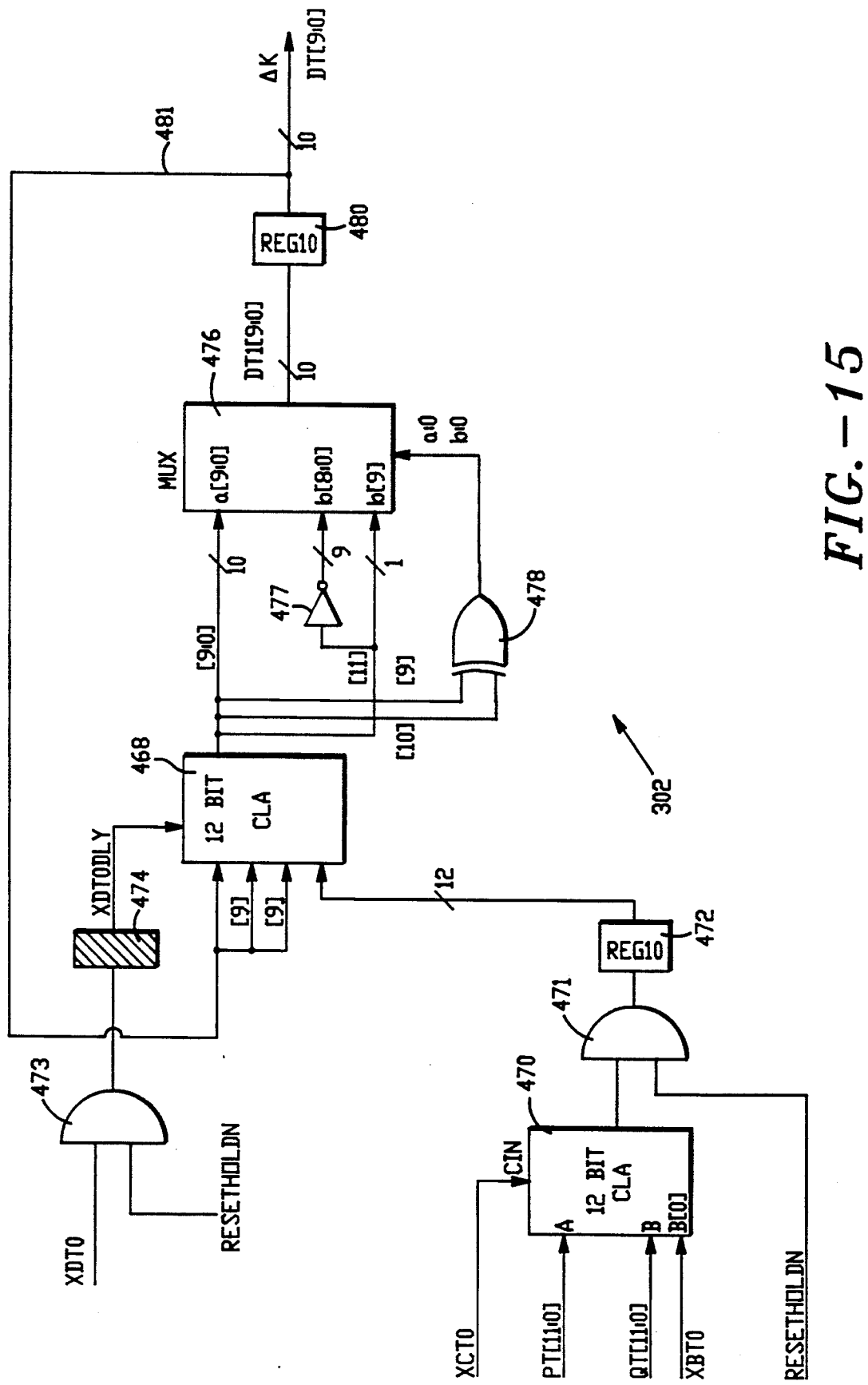
FIG. 15 is a detailed block diagram of a fourth timing calculation circuit block shown in the FIG. 9 block diagram.

Turning now to FIG. 15, the fourth timing calculation circuit 302 receives and combines the QT and PT values from the adder 448 in a 12 bit carry lookahead adder 470. A carry input is provided by the value XCT0, while a low order bit position for the QT input is provided by the XBT0 value. A reset selector 471 selects, and a delay register 472 delays, the resultant sum by one clock cycle. The other input to the selector 471 comprises a reset value for resetting the carry lookahead adder 468. The resultant put out from the register 472 is the scaling value $\beta z_k$ which is a term of the equation (4). This term is combined with a $\Delta_k$ term from a feedback path 481 in another 12 bit carry lookahead adder 468 which puts out a sum. A carry input for the adder 468 is developed from a signal XDT0 which passes through a reset selector 473 and a delay register 474 before reaching the carry input of the adder 468. The sum put out by the adder 468 is directly applied as one input to a multiplexer 476. As before, the MSB of the sum is used to generate a saturation value via an inverter 477 which is applied to a second input to the multiplexer 476. An exclusive-OR gate 478 compares bits [9] and [10] to develop a sign bit for controlling the multiplexer 476. The result put out by the multiplexer 476 is delayed by a single clock period delay register 480 and put out on the path 481 to the second timing calculation circuit 298 as the value $\Delta_k$ in accordance with equation (4).

Figure 16:
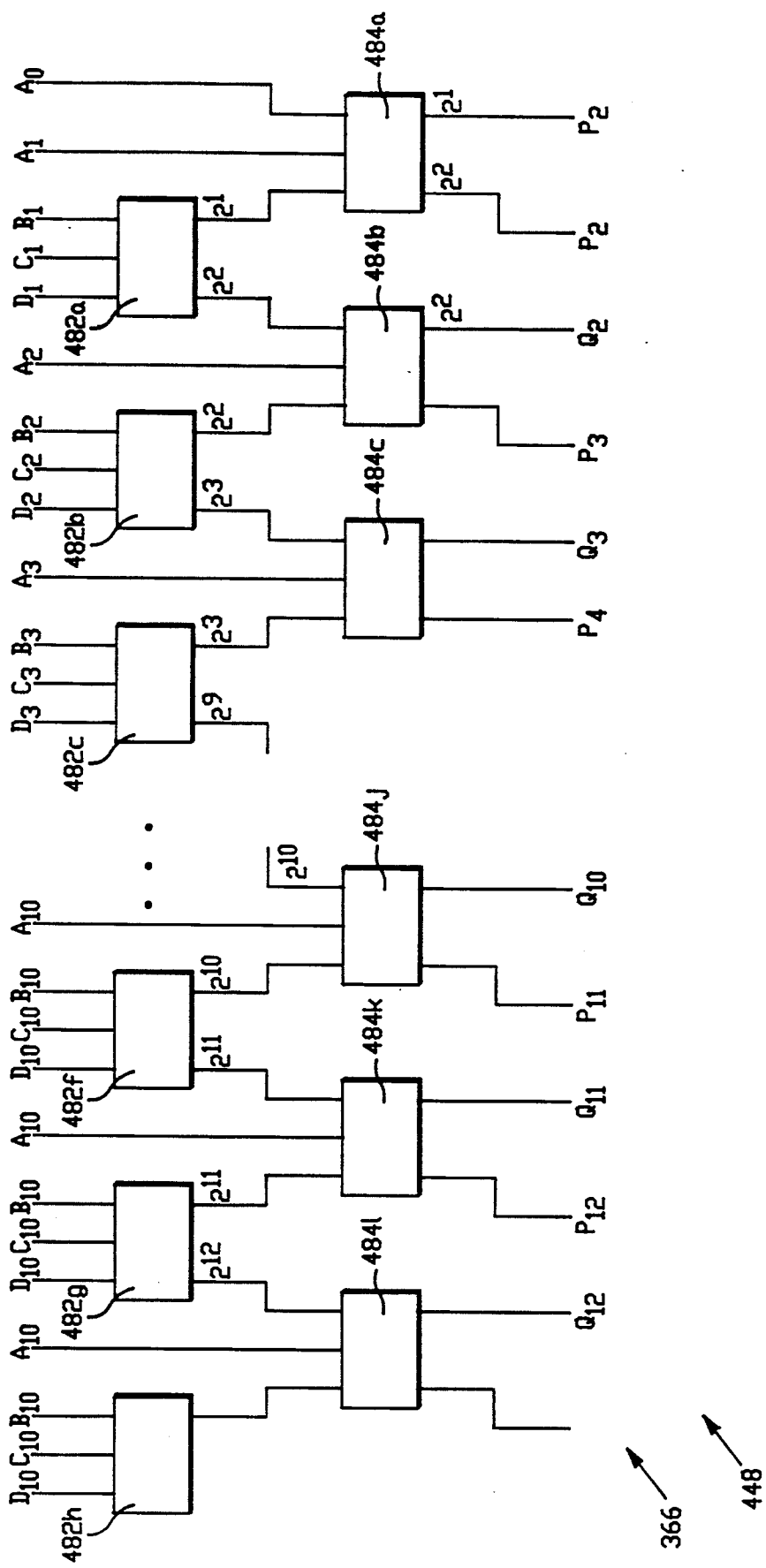
FIG. 16 is a detailed block diagram of a two level carry save adder circuit used within the first and third timing calculation circuit blocks depicted in FIGS. 12 and 14.
Figure 17:
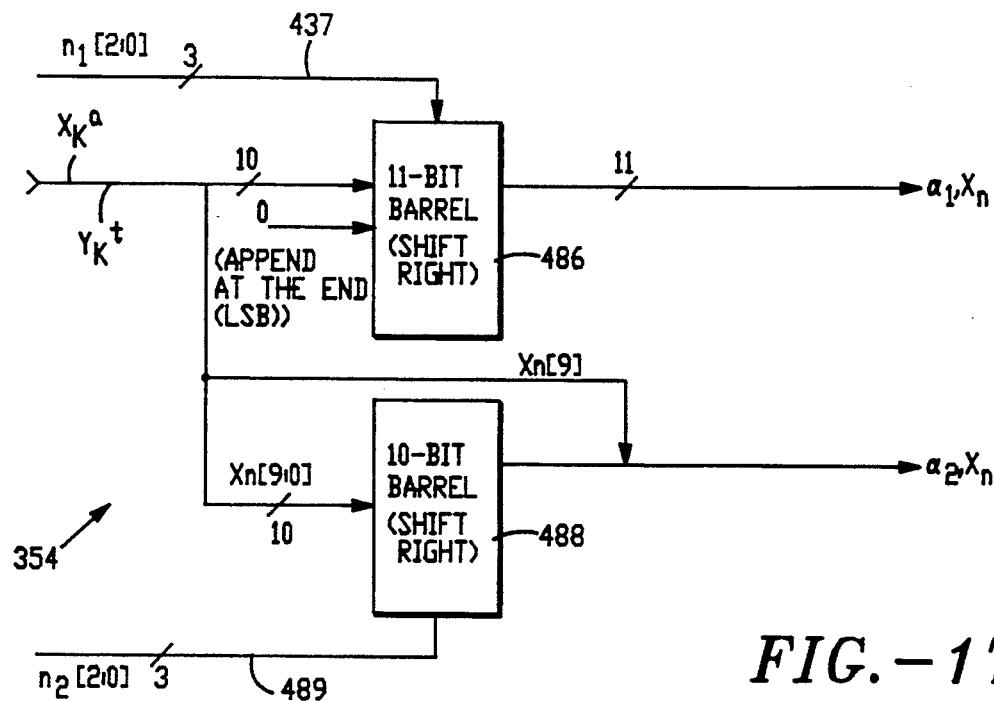
FIG. 17 is a block diagram of a first barrel shifter circuit shown in the FIG. 12 first timing calculation circuit block diagram.
Figure 18:
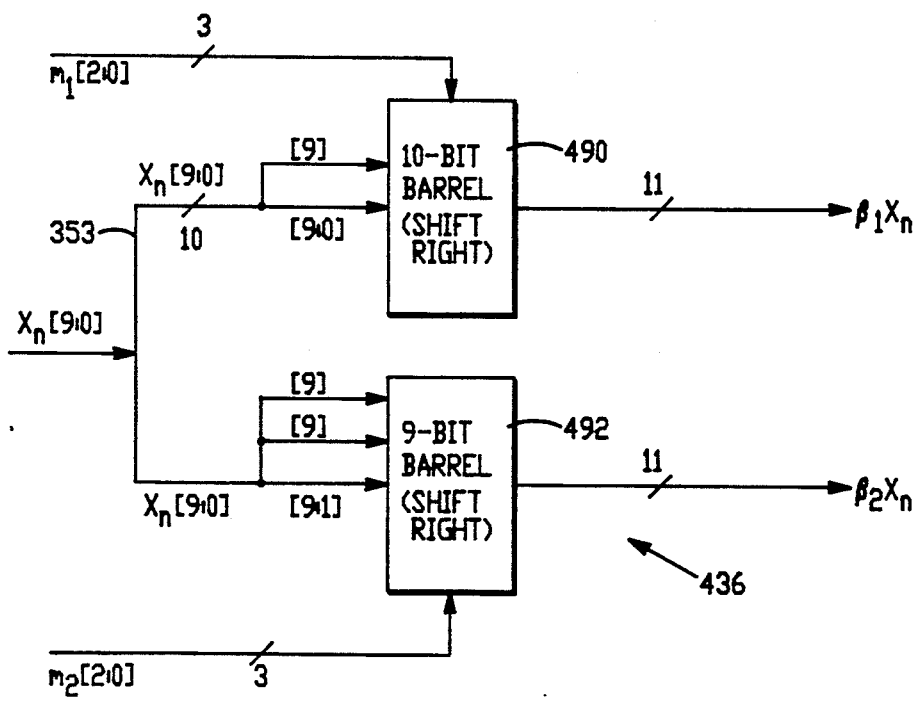
FIG. 18 is a block diagram of a second barrel shifter circuit shown in the FIG. 14 third timing calculation circuit block diagram.

The two level carry save adders 366 and 448 are implemented in accordance with the logic array illustrated in FIG. 16 wherein the first level comprises adders 482 $a$–482$h$, and the second level comprises adders 484$a$ through 484$l$. The connections are as illustrated in FIG. 16. The first barrel shifter 354 is shown in FIG. 17 as comprising an 11-bit barrel shifter (right) 486, and a 10-bit barrel shifter (right) 488. The $2^{-n1}$ coefficient is applied to the shifter 468 via a path 487, while the $2^{-n2}$ coefficient is applied to the shifter 488 via a path 489. The barrel shifter 486 puts out the value $\alpha 1 x_k$ ($\alpha 1 y_k$), while the barrel shifter 488 puts out the value $\alpha 2 x_k$ ($\alpha 2 y_k$). The second barrel shifter 436 is shown in FIG. 18, includes a 10 bit barrel shifter 490 which multiplies the $2^{-m1}$ coefficient by the $x_k$ value (acquisition) or $y_k$ value (tracking) to produce $\beta 1 x_k$ ($\beta 1 y_k$), and a 9 bit barrel shifter 492 which multiplies the $2^{-m2}$ value by $x_k$ ($y_k$) to produce $\beta 2 x_k$ ($\beta 2 y_k$).

ZERO PHASE START

In order to reduce the length of, and time required for, the ID field preamble sinewave, and thereby to increase storage area available for user data, it is necessary to provide a rapid resynchronization of the current controlled oscillator 62 to incoming data upon a switch from non-read mode to read mode. One way to reduce the time required to acquire correct phase is to stop momentarily the current controlled oscillator 62 and then to restart it in proper phase synchronism with the incoming analog sinewave signal being read back from the disk during the ID field preamble time.

As discussed above, prior peak detection techniques have been able to synchronize a voltage controlled oscillator element of a data separator phase locked loop by virtue of the fact that the incoming read raw data has been differentiated. The edges associated with the differentiated analog waveform are therefore available to establish correct phase timing and lock. In a sampled data system, such as the present PR4,ML system of the present invention, the analog signal is not differentiated. Rather, it is sampled by the flash A/D converter 46. As noted previously, it is necessary to sample the analog waveform at the proper location, denoted SL in the waveforms graphed in FIG. 8, graph B and FIG. 19, graph A.

Figure 19:
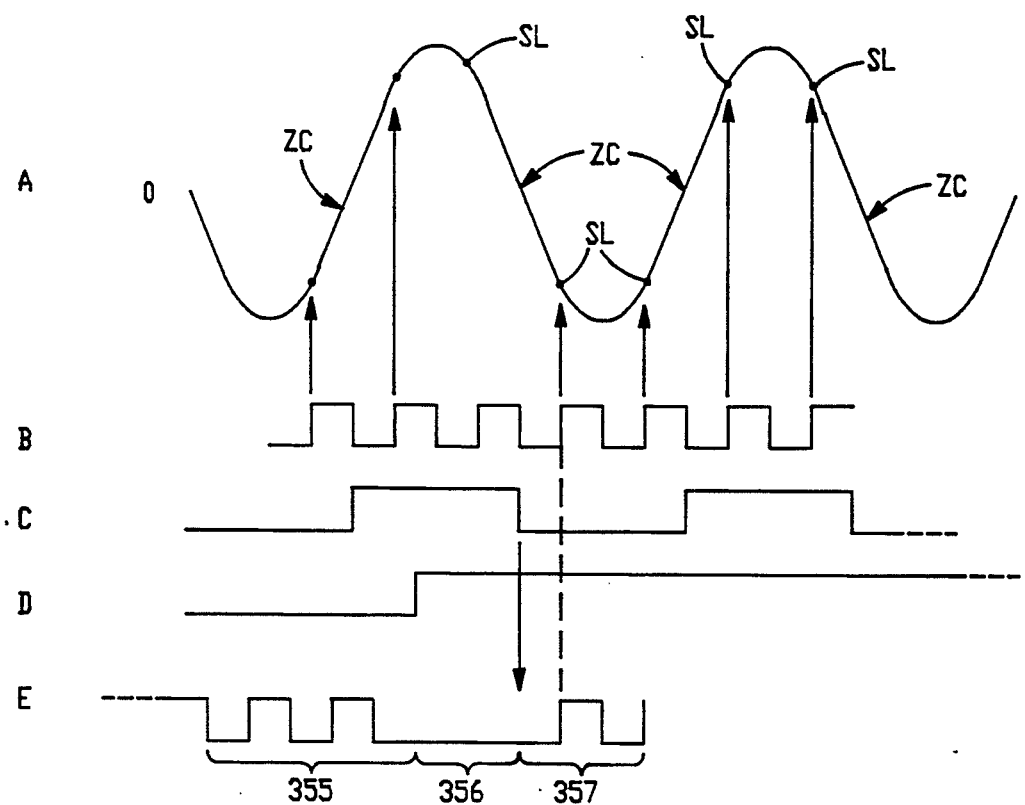
FIG. 19 comprises a series of waveform graphs A through E which are related to a zero phase start control circuit within the FIG. 7 multi-mode timing loop and incorporating aspects of the present invention.

Since the preamble of the ID field will be reproduced by the selected data transducer head 26 as an approximate sinewave, shown in FIG. 19, graph A, it is apparent by inspection that there is a fixed time relationship between the ideal sample locations SL and the zero crossings ZC of this waveform. Thus, by detecting the location of zero crossings of the waveform, a timing loop may be established which may be used to inhibit the current controlled oscillator 62 when the read gate signal RDGATE on the path 275 becomes true.

One way to detect zero crossings is by using a comparator, such as the differential path analog comparator 276 shown in FIG. 7. The inputs to the comparator 276 are differential complements of the analog signal presented at the input of the flash A/D converter 46. Ideally, the comparator 276 generates and puts out a waveform which is a digital equivalent of the preamble sinewave. The ideal digital equivalent is graphed as waveform C of FIG. 19 in relation to a synchronized bit clock, waveform B, and the incoming sinewave of the preamble field, waveform A. In this example, the rising edge of the waveform A sinewave causes the comparator output to become true as it passes through the rising edge zero crossing ZC, and to become false as it passes through the falling edge zero crossing ZC.

In practice, there are logic circuit delays resulting from the operation of the comparator 276, and from a zero phase start logic array 278. The fixed duration delays associated from signal latencies in the comparator 276 and zero phase start logic 278 are lumped and denoted by the delay element 277. If one were using a single frequency, rather than a plurality of frequencies adapted to the radial data zones 70-1 through 70-9, the delay element 277 could be readily tuned to the precise delay length to create the ideal phase relationship illustrated in FIG. 19, graph C, with the FIG. 19, graph A waveform. However, with programmable data rates, the delay ideally is provided with a delay component which is a function of the particular frequency.

This variable delay component is most preferably incorporated into the structure of the current controlled oscillator 62 and is denoted by the element 280. Thus, when the fixed delay 277 is summed with the variable delay 280, the resultant achieved is the desired phase relationship between the incoming differential analog signal and the ICO output (SAMPLECLK).

In operation, the synthesizer 262 is generating the nominal write clock during non-read times, and that clock is used to control the current controlled oscillator 62 via the analog timing loop 60 as explained. The clock frequency, which is not phase locked with the incoming data, is depicted as a segment 355 of waveform E of FIG. 19. The moment that the read gate signal RDGATE on the path 275 is asserted, shown as waveform D of FIG. 19, the operation of the oscillator 62 is momentarily paused, as at a segment 356 of waveform E. This pause, which may be of a variable length covering a fraction to several cycles of the waveform A signal, continues until the comparator output goes false. On the falling edge of the comparator signal, waveform C, the current controlled oscillator clock is restarted as shown at a segment 357 of waveform E of FIG. 19. Therein, the clock cycle is shown to be delayed by a fixed delay increment and a variable delay increment. The samples are then taken coincident (within a modest error margin) with the rising edge of the phase-adjusted output clocking signal ADCLK. Following the zero phase start process, any remaining phase error is removed during the timing acquisition mode of the dual mode timing loop, as previously explained.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A multi-mode timing loop for a PR4,ML sampled data channel including an analog to digital sampling and conversion means for providing raw digital samples of data at a sample clock rate and a digital finite impulse response filter means connected downstream of said analog to digital sampling and conversion means for providing conditioned digital samples at the sample clock rate, said timing loop comprising:

reference clock source means for putting out a reference clock frequency related to a nominal sample clock rate for sampling data in said channel, controllable oscillator means for putting out a sample clock, an analog timing loop including:
  phase detector means for detecting and putting out a phase error between said reference clock frequency and said sample clock,
  charge pump means connected to receive said phase error and pump charge during a non-data read mode of operation of said multi-mode timing, loop,
  analog loop filter and charge storage means connected to receive charge pumped by said charge pump means during a non-data read mode and to filter and hold said charge during a data read mode of operation, said analog loop filter for putting out an analog timing control value to said controllable oscillator means, a digital timing loop including:
  timing error extraction means connected to receive said digital samples from said finite impulse response filter means for extracting timing error values therefrom,
  digital timing loop filter means for filtering said timing error values, and
  timing digital to analog converter means for converting said filtered timing error values into analog vernier timing correction values and for supplying said analog vernier timing correction values to said frequency controllable oscillator means during the data read mode, whereby the analog timing loop provides phase lock during non-data read mode and wherein during the data read mode the digital timing loop provides a vernier offset for fine adjustment of phase lock to a static setting provided by said analog timing loop at said frequency controllable oscillator means.

2. The multi-mode timing loop set forth in claim 1 wherein the timing error extraction means is connected to receive raw data samples during an acquisition submode of said data read mode, and is connected to receive conditioned data samples during a tracking submode of said data read mode.

3. The multi-mode timing loop set forth in claim 2 wherein the timing error extractor circuit extracts during the acquisition submode the following timing error:

$$z_k^a = -x_k \hat{x}_{k-1} + x_{k-1} \hat{x}_k$$

and extracts during the tracking submode the following timing error:

$$z_k^t = -y_k \hat{y}_{k-1} + y_{k-1} \hat{y}_k$$

where $x_k$ represent raw data samples and $y_k$ represent filtered and conditioned data samples.

4. The multi-mode timing loop set forth in claim 2 wherein the digital timing loop filter means generates a filtered timing error during acquisition and tracking submodes as follows:

$$\alpha z_k + \Delta_k.$$

5. The multi-mode timing loop set forth in claim 1 further comprising zero phase start mean s connected to stop and restart said controllable oscillator means in response to detected phase of an analog data stream received by said analog to digital sampling and conversion means.

6. The multi-mode timing loop set forth in claim 5 wherein said zero phase start means comprises analog comparator means connected to said analog data stream for comparing reference amplitude axis crossings of analog signals therein, and for putting out a start signal, zero phase start logic means connected to receive the start signal and put out the start control and variable delay means associated with the controllable oscillator means for stopping and then restarting operation thereof at a controllable instant following receipt of said start control.

7. The multi-mode timing loop set forth in claim 1 further comprising summing junction means for receiving and combining a control value related to said reference clock frequency, said analog timing error value and said analog vernier timing correction values into a sum thereof, and for supplying said sum to control said frequency controllable oscillator means.

8. The multi-mode timing loop set forth in claim 1 wherein said reference clock source comprises a programmable frequency synthesizer phase locked loop means.

9. The multi-mode timing loop set forth in claim 1 futher comprising an updata rate scaler means within the digital timing loop and wherein the update rate scaler means and the timing digital to analog converter means are clocked at a rate one half of the rate of the sample clock.

10. The multi-mode timing loop set forth in claim 9 wherein the update rate scaler means puts out to the timing digital to analog converter means the following:

$$v_k = \tfrac{1}{2}[(\alpha z_k + \Delta_k) + (\alpha z_{k-1} + \Delta_{k-1})]$$

for one of even and odd filtered timing error values, and $$v_k = v_{k-1}$$

for the other of the even and odd filtered timing error values.

11. A method for timing a PR4,ML sampled data channel including an analog to digital sampling and conversion means for providing raw digital samples of data at a sample clock rate and a digital finite impulse response filter means connected downstream of said analog to digital sampling and conversion means for providing conditioned digital samples at the sample clock rate, said timing method comprising the steps of:

putting out a reference clock frequency related to a nominal sample clock rate for sampling data in said channel, generating and putting out a sample clock, detecting and putting out an analog phase error between said reference clock frequency and said sample clock, charging a storing means with a charge related to said phase error during a non-data read mode, filtering and converting said charge into an analog timing control value and applying said analog timing control value to control the frequency of said sample clock during the non-data read mode and during a data read mode, receiving said digital samples from said finite impulse response filter means and extracting timing error values therefrom, filtering said timing error values, and converting said filtered timing error values into analog vernier timing correction values and supplying said analog vernier timing correction values to adjust the frequency of said sample clock during the data read mode.

12. The method set forth in claim 11 comprising the further step of dividing said digital samples by a predetermined divisor and supplying a value related to a resultant quotient to adjust the frequency of said sample clock during the data read mode.

13. The method set forth in claim 12 wherein the divisor is two.

14. The method set forth in claim 11 further comprising the steps of:

detecting a predetermined phase within an analog data stream received by said analog to digital sampling and conversion means, and stopping and restarting a controllable oscillator means generating said sample clock in response to the step of detecting said phase of the analog data stream.

15. The method set forth in claim 14 comprising the further steps of:

comparing reference amplitude axis crossings of analog signals in said analog data stream and for putting out a start control, and stopping and then restarting operation of the controllable oscillator at a controllable instant following the start control.

* * * * *